(12) United States Patent
Abhishek et al.

(10) Patent No.: US 10,804,974 B2
(45) Date of Patent: Oct. 13, 2020

(54) N-PATH MIXER-BASED RECEIVER APPARATUS AND METHOD WITH TRANSMITTER SELF-INTERFERENCE REJECTION

(71) Applicant: Oregon State University, Corvallis, OR (US)

(72) Inventors: Agrawal Abhishek, Corvallis, OR (US); Natarajan Arun, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 15/977,448

(22) Filed: May 11, 2018

(65) Prior Publication Data

US 2020/0274564 A1    Aug. 27, 2020

Related U.S. Application Data

(60) Provisional application No. 62/505,772, filed on May 12, 2017.

(51) Int. Cl.
| | |
|---|---|
| *H04B 7/0413* | (2017.01) |
| *H04B 7/26* | (2006.01) |
| *H04B 1/40* | (2015.01) |
| *H04B 1/10* | (2006.01) |
| *H04B 1/707* | (2011.01) |

(52) U.S. Cl.
CPC ......... *H04B 7/0413* (2013.01); *H04B 1/1036* (2013.01); *H04B 1/40* (2013.01); *H04B 1/707* (2013.01); *H04B 7/2628* (2013.01)

(58) Field of Classification Search
CPC ... H04B 1/1036; H04B 1/707; H04B 1/70756
See application file for complete search history.

(56) References Cited

U.S. PATENT DOCUMENTS

| | | | | |
|---|---|---|---|---|
| 6,807,222 | B1 * | 10/2004 | Widwowson | H04B 1/707 375/147 |
| 6,980,527 | B1 * | 12/2005 | Liu | H04B 7/0408 370/280 |
| 8,699,975 | B1 | 4/2014 | Schleicher et al. | |
| 2005/0254558 | A1 * | 11/2005 | Charles Dutka | H04B 1/708 375/149 |
| 2011/0053525 | A1 | 3/2011 | Yi | |
| 2019/0207288 | A1 | 7/2019 | Zhu et al. | |

OTHER PUBLICATIONS

Reiskarimian, Negar, et al. "A CMOS Passive LPTV Nonmagnetic Circulator and Its Application in a Full-Duplex Receiver", IEEE Journal of Solid-State Circuits, vol. 52, No. 5, May 2017, pp. 1358-1372 (15 pages).

(Continued)

*Primary Examiner* — David S Huang
(74) *Attorney, Agent, or Firm* — Green, Howard & Mughal LLP

(57) ABSTRACT

An apparatus comprising: a receiver; and one or more N-path filters coupled to an input of the receiver, wherein the one or more N-path filters apply a combination of non-overlapping pulses and a pseudo noise (PN) code.

21 Claims, 23 Drawing Sheets

(56) References Cited

OTHER PUBLICATIONS

Van Liempd, Barend et al. "A +70-dBm IIP3 Electrical-Balance Duplexer for Highly Integrated Tunable Front-Ends", IEEE Transactions on Microwave Theory and Techniques, vol. 64, No. 12, Dec. 2016, pp. 4272-4286 (13 pages).
Abhishek & Natarajan, "A 0.3 GHz to 1.4 GHz N-path Mixer-based Code-Domain RX with TX Self-Interference Rejection", Radio Frequency Integrated Circuits Symposium (RFIC), 2017 IEEE; Jun. 4-6, 2017; DOI: 10.1109/RFIC.2017.7969070. (4 pages).
Abhishek & Natarajan, "A Concurrent Dual-Frequency/Angle-of-Incidence Spatio-spectral Notch Filter using Walsh Function Passive Sequence Mixers", 2017 IEEE/MTT-S International Microwave Symposium—IMS 2017; 10.1109/MWSYM.2017.8058941 (4 pages).
Non-Final Office Action dated Sep. 16, 2019 for U.S. Appl. No. 15/956,660.
Notice of Allowance dated Jun. 10, 2020 for U.S. Appl. No. 15/956,660.

* cited by examiner

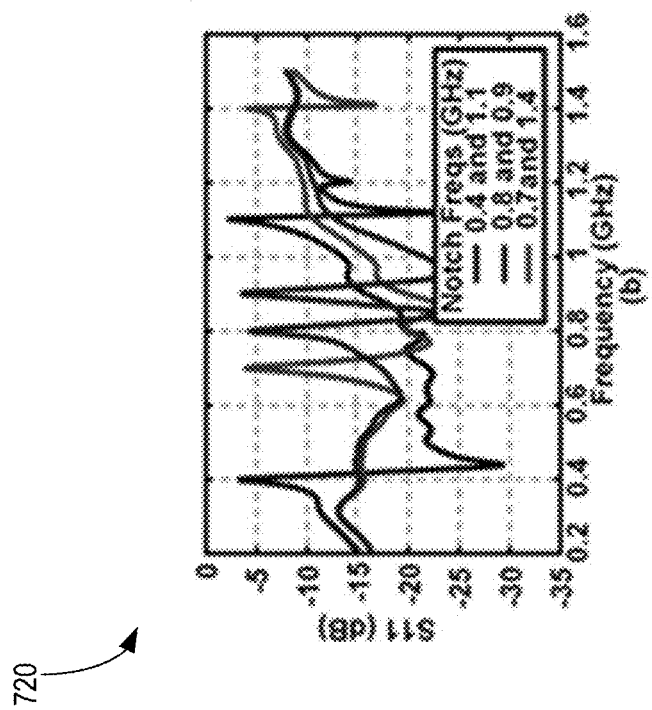
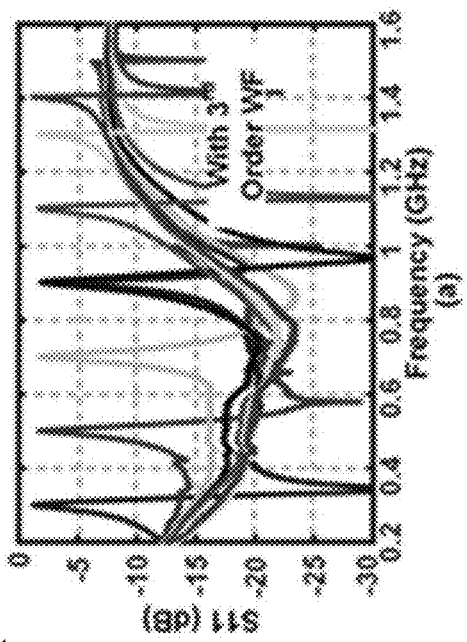
Fig. 7A
Fig. 7B

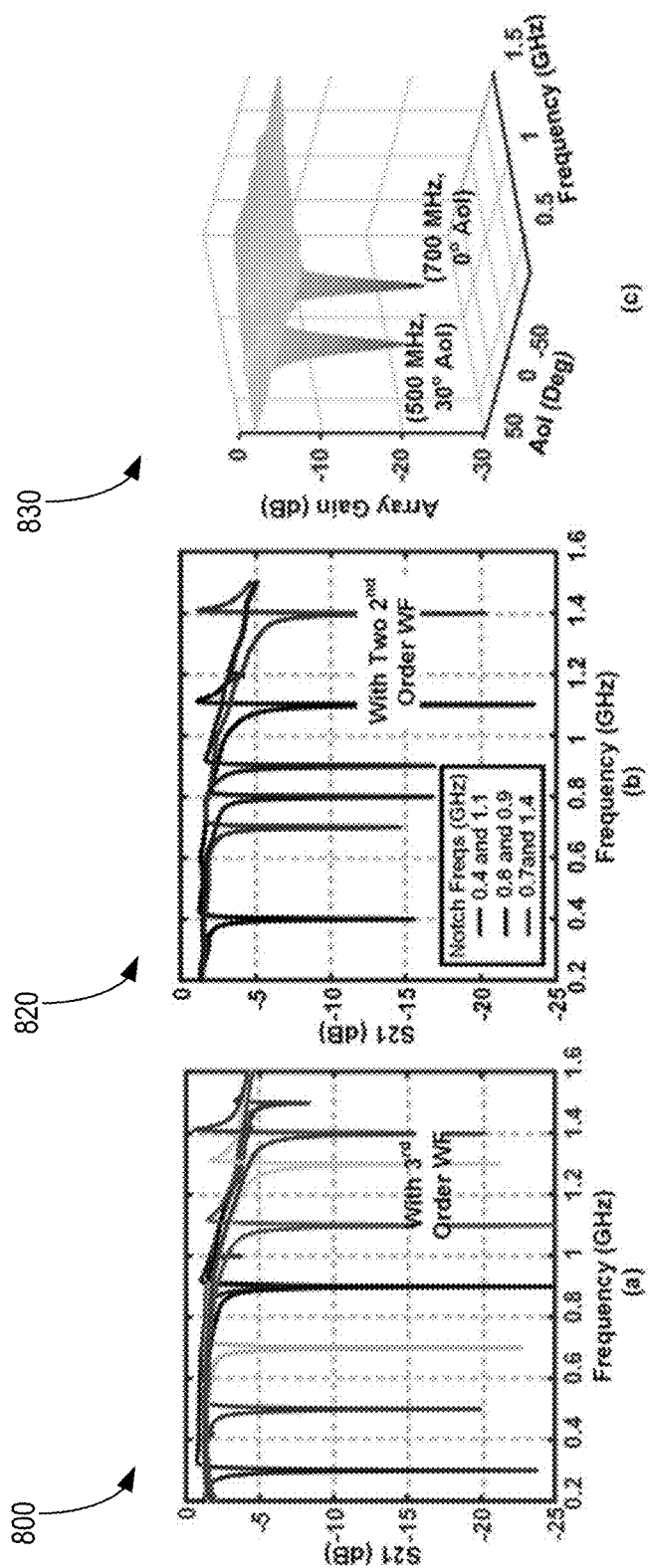

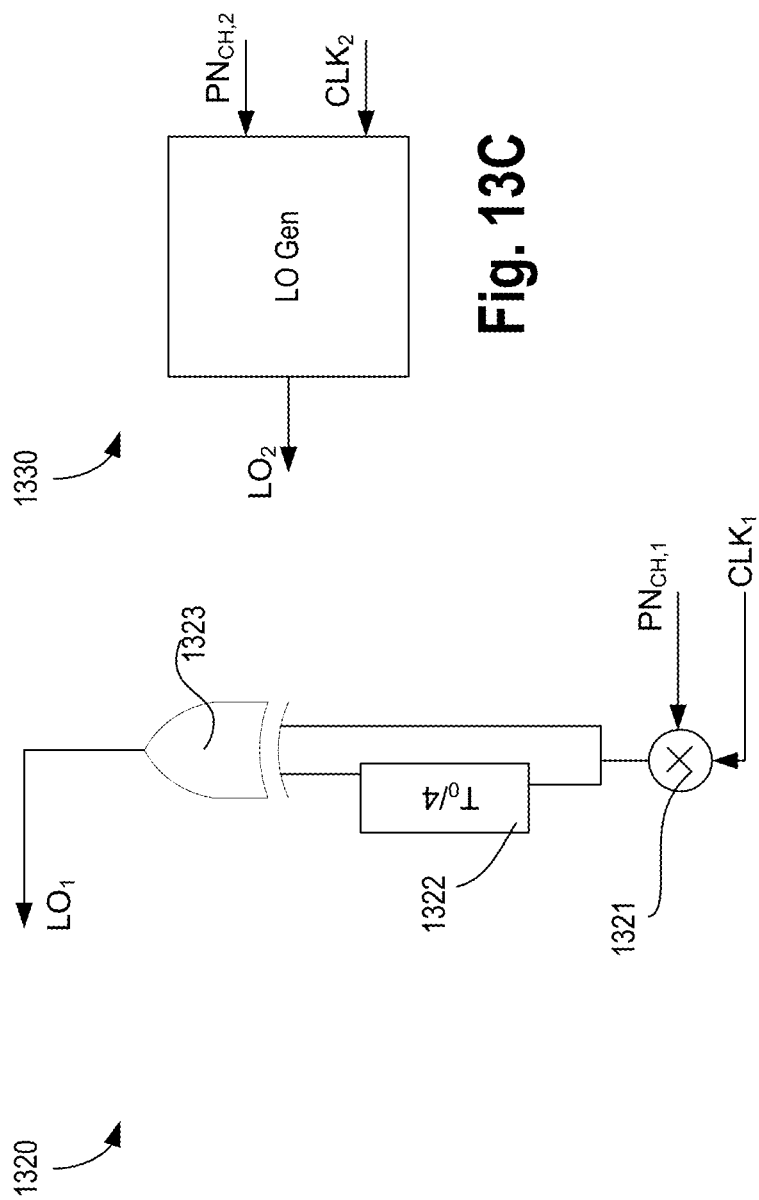

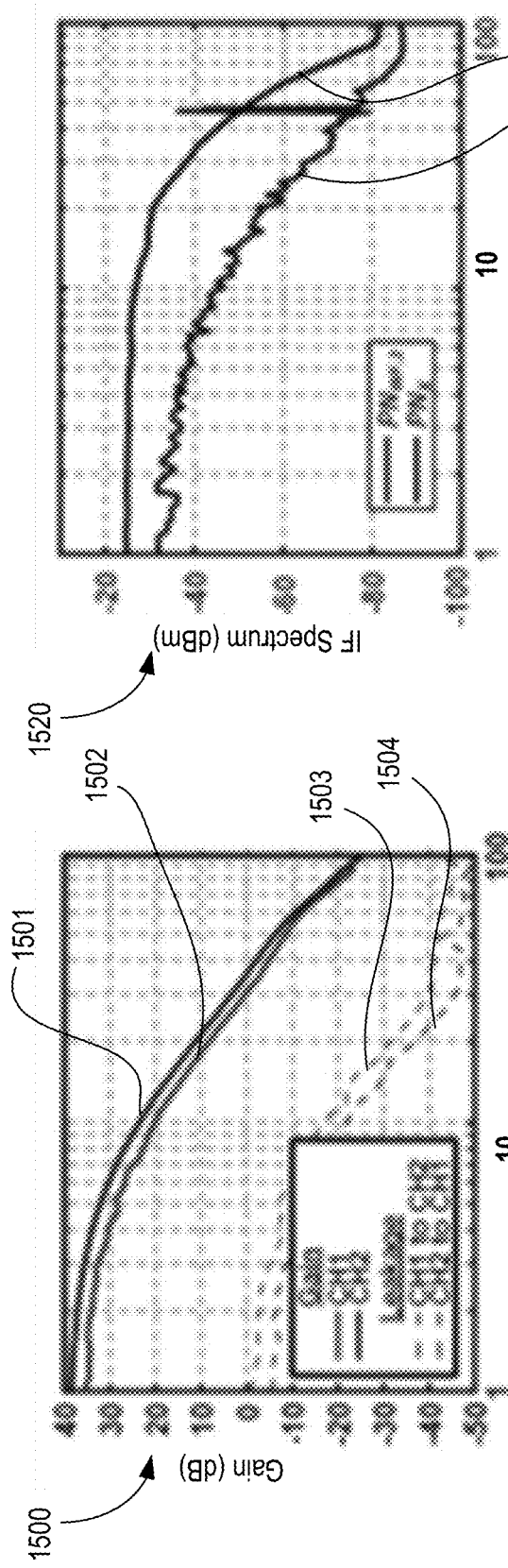
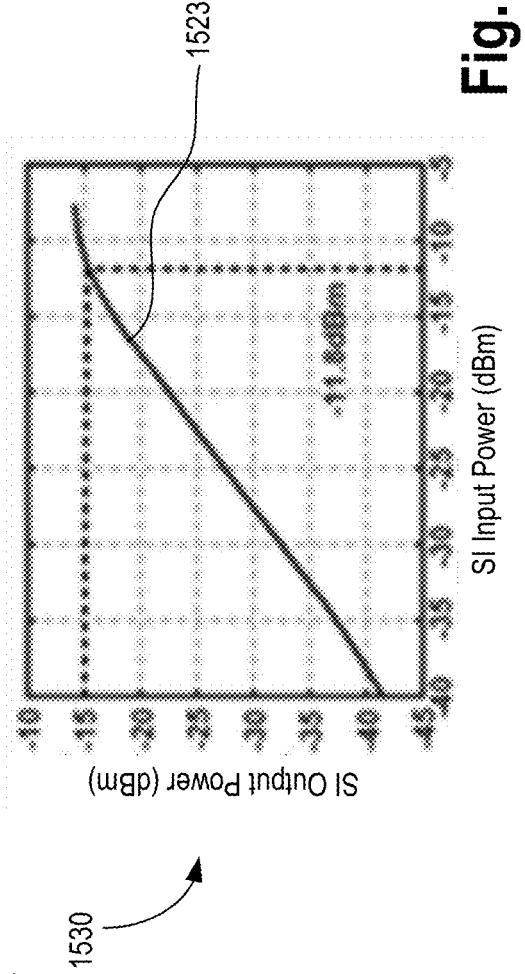
Fig. 15A
Fig. 15B
Fig. 15C

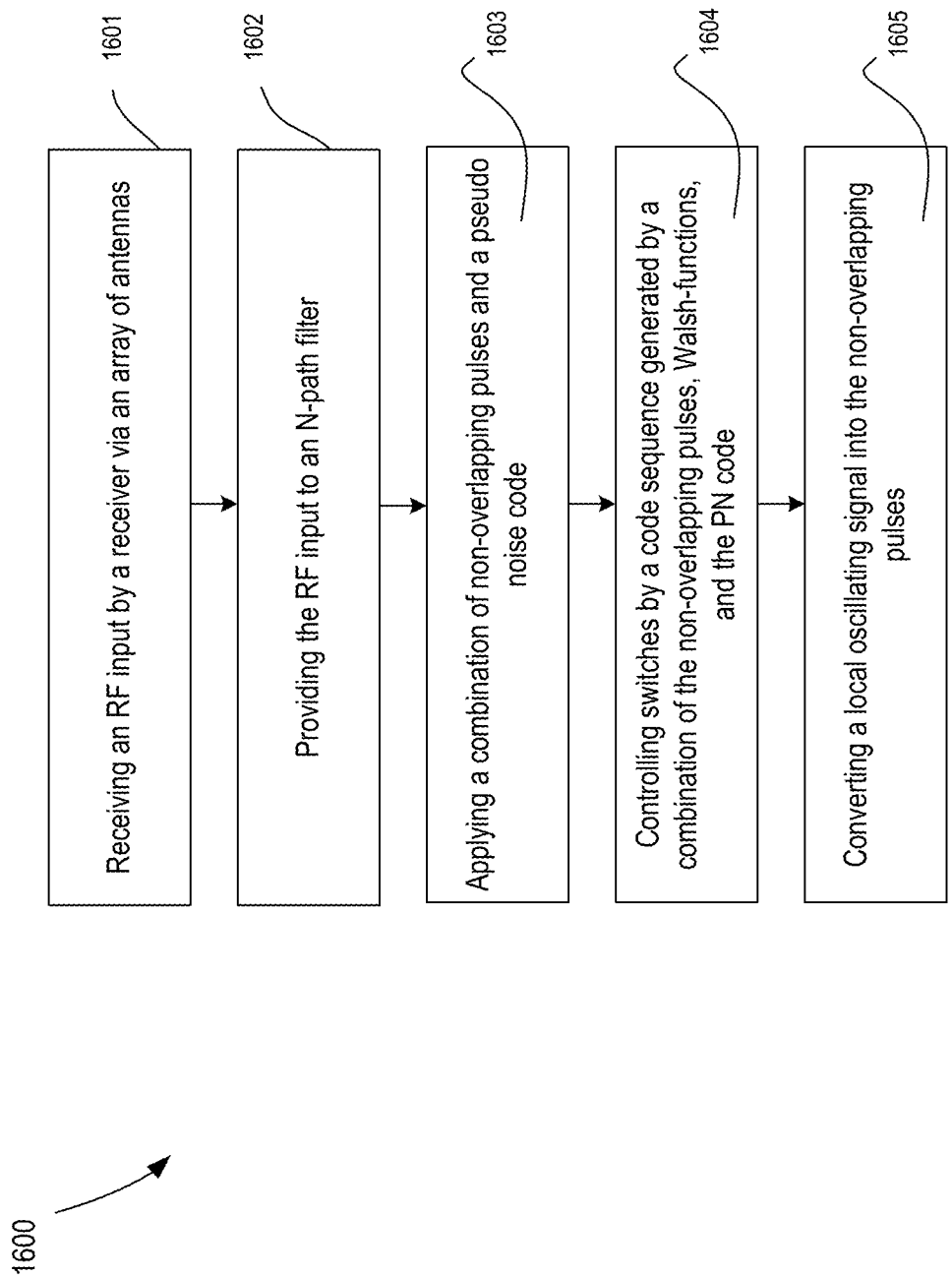

N-PATH MIXER-BASED RECEIVER APPARATUS AND METHOD WITH TRANSMITTER SELF-INTERFERENCE REJECTION

CLAIM FOR PRIORITY

This application claims priority to U.S. Provisional Patent Application No. 62/505,772, filed on 12 May 2017, titled "N-PATH MIXER-BASED RECEIVER WITH TRANSMITTER SELF-INTERFERENCE REJECTION," and which is incorporated by reference in its entirety.

GOVERNMENT SUPPORT STATEMENT

The embodiments of the invention were made with the support of the United States Government under Award No. N66001-14-1-4013 awarded by the Defense Advanced Research Projects Agency (DARPA). The Government has certain rights in the invention.

BACKGROUND

Emerging 5G applications rely on increased spectrum reuse to increase network capacity, leading to increase in in-band or co-channel interference (CCI) in receivers. While phased-arrays (e.g., Multiple-input-Multiple-output (MIMO) arrays) enable spatial filtering of CCI, digital beamforming (DBF), in such arrays it is desirable for reconfigurable, concurrent multiple beams. However, the absence of analog spatial filtering results in high Analog-to-Digital (ADC) dynamic range requirements to tolerate CCI/jammers. The absence of analog spatial filtering has led to interest in development of notched-arrays with spatio-spectral notching of jammers/interferers in RF/analog prior to the ADC and DBF. Prior spatio-spectral notching approaches include spatio-spectral filtering of one blocker at an RF (radio frequency) input in an X-band array and spatio-spectral filtering of one blocker using feed-forward cancellation (FFC) at the baseband.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIGS. 7A-B illustrate plots showing measured S11 parameters for one PSNF input/output pair with $3^{rd}$ order WF-seq for single frequency and two $2^{nd}$-order WF-seq for concurrent dual-frequency tunable notch, respectively, in accordance with some embodiments.

FIGS. 8A-B illustrate plots showing measured S21 parameters for one PSNF input/output pair with $3^{rd}$ order WF-seq for single frequency and two $2^{nd}$-order WF-seq for concurrent dual-frequency tunable notch, respectively, in accordance with some embodiments.

FIGS. 8C-D illustrate measured array gain for a 4-element array for two settings demonstrating concurrent dual frequency/AoI (angle-of-incidence) notch filtering, in accordance with some embodiments.

FIG. 8E illustrates measured constellation with and without notch filtering for wireless test setup with in-band −10 dBm AWGN (Additive white Gaussian noise) blocker at the RF (Radio Frequency) input, in accordance with some embodiments.

FIGS. 13A-C illustrate schematics of a dual-correlator gain-boosted N-path RX, according to some embodiments of the disclosure.

FIG. 15A illustrates a plot showing measured RX gain and isolation between a first channel and a second channel, in accordance with some embodiments.

FIG. 15B illustrates a plot showing measured two-tone SI at RX output following spreading and de-spreading, in accordance with some embodiments.

FIG. 15C illustrates a plot showing measured integrated in-band RX output power for modulated SI, in accordance with some embodiments.

FIG. 16 illustrates a flowchart of a method of filtering, in accordance with some embodiments.

DETAILED DESCRIPTION

Figure 2A:
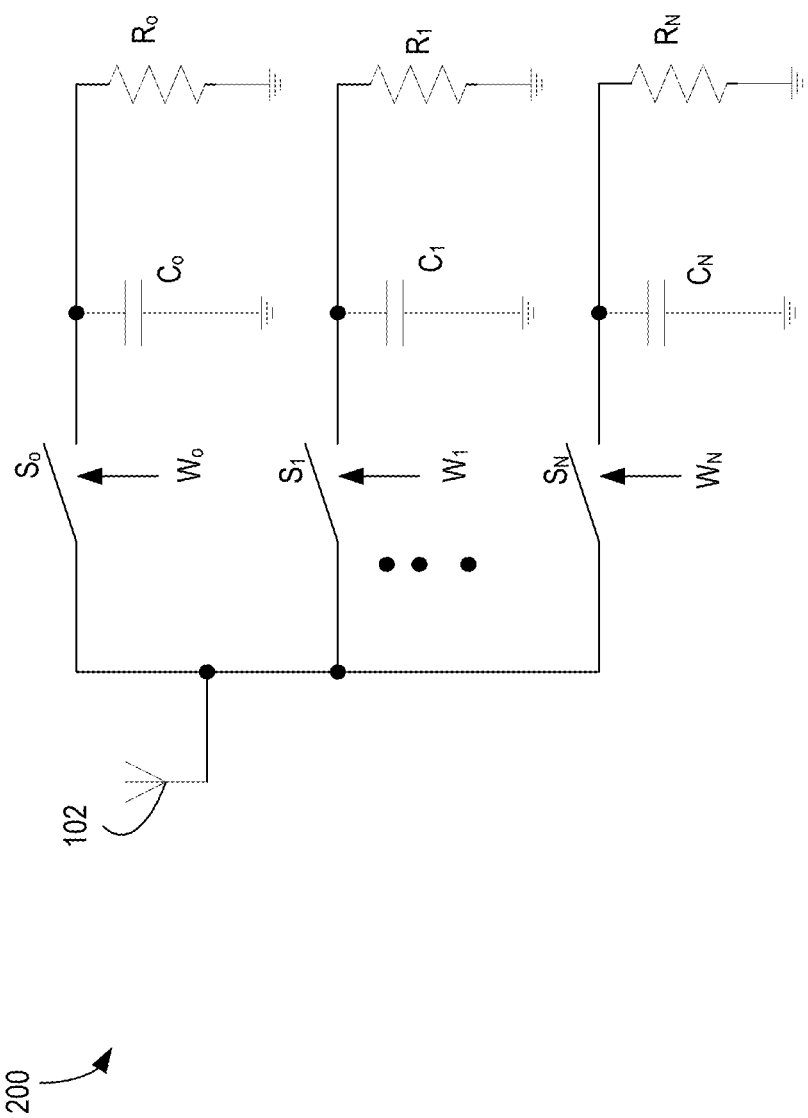
FIGS. 2A-B illustrate a code-domain receiver implementation using N-path filters, and associated control signals and apparatus, in accordance with some embodiments.

Some embodiments provide blocker suppression at a radio frequency (RF) or intermediate frequency (IF) input to address intermodal products between blockers as well as between blockers and a desired signal. Some embodiments describe a scalable, reconfigurable receiver (RX) architecture for parallel spatio-spectral notch filtering (PSNF) that allows concurrent rejection of two or more blockers at two or more independent frequencies/angle-of-incidence (AoI) at each antenna input in a DBF array. In some embodiments, the PSNF combines orthogonality of Walsh function sequences (WF-seq) and impedance translation of passive mixers to enable re-configurability, providing high spatio-spectral attenuation (e.g., greater than 20-dB spatio-spectral attenuation) at the RF input (e.g., 18 dB higher at RF input than state-of-art schemes) for one frequency/AoI notch and higher rejection (e.g., approximately −15 dB rejection) at two independent frequencies/AoI. The approach of various embodiments can be extended to higher frequencies with technology scaling. In some embodiments, the approach can be combined with feedforward cancellation of jammers/interferers for interferer-mitigation in Multiple-Input-Multiple-Output (MIMO) arrays.

Some embodiments extend frequency-domain and spatial-domain N-path filtering to code-domain filtering by considering sequence mixing using N-path passive mixers. Some embodiments describe a code-domain N-path receiver (RX) based on pseudo noise (PN) code (PN-code) modulated LO (local oscillator) pulses for concurrent reception of two code-modulated signals. Some embodiments use a combination of Walsh-Function and PN sequence to translate in-band transmitter (TX) self-interference (SI) to out-of-band at N-path RX output enabling frequency filtering for high SI rejection. In one example, a 0.3 GHz-1.4 GHz 65-nm CMOS (Complementary Metal Oxide Semiconductor) implementation is described with 35 dB gain for desired signals which concurrently receives two RX signals while rejecting mismatched spreading codes at the RF input. The TX SI mitigation approach of some embodiments results in high rejection at the RX input (e.g., 38.5 dB rejection for −11.8 dBm 1.46 Mb/s QPSK (Quadrature Phase Shift Keying) modulated SI at the RX input). In one example, the RX achieves 23.7 dBm OP1 dB (gain compression) for in-band SI, while consuming approximately 35 mW and occupies 0.31 mm². Other technical effects will be evident from the various embodiments and figures.

The embodiments of the disclosure will be understood more fully from the detailed description given below and from the accompanying drawings of various embodiments of the disclosure, which, however, should not be taken to limit the disclosure to the specific embodiments, but are for explanation and understanding only.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, optical, electromagnetic signal, magnetic signal, or data/clock signal. The meaning of "a," "an," and "the" include plural references. The meaning of "in" includes "in" and on.

The term "blocker" here generally refers to any undesired large signal that is incident on a receiver with the desired signal. Due to the large signal strength of the blocker, the RF/analog front-end of the receiver generally produces an undesired distorted signal and this reduces the gain of the desired signal and causes reception degradation. In some cases, the blocker causes the reception to be impossible by the receiver.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The s "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described, but are not limited to such.

Figure 1:
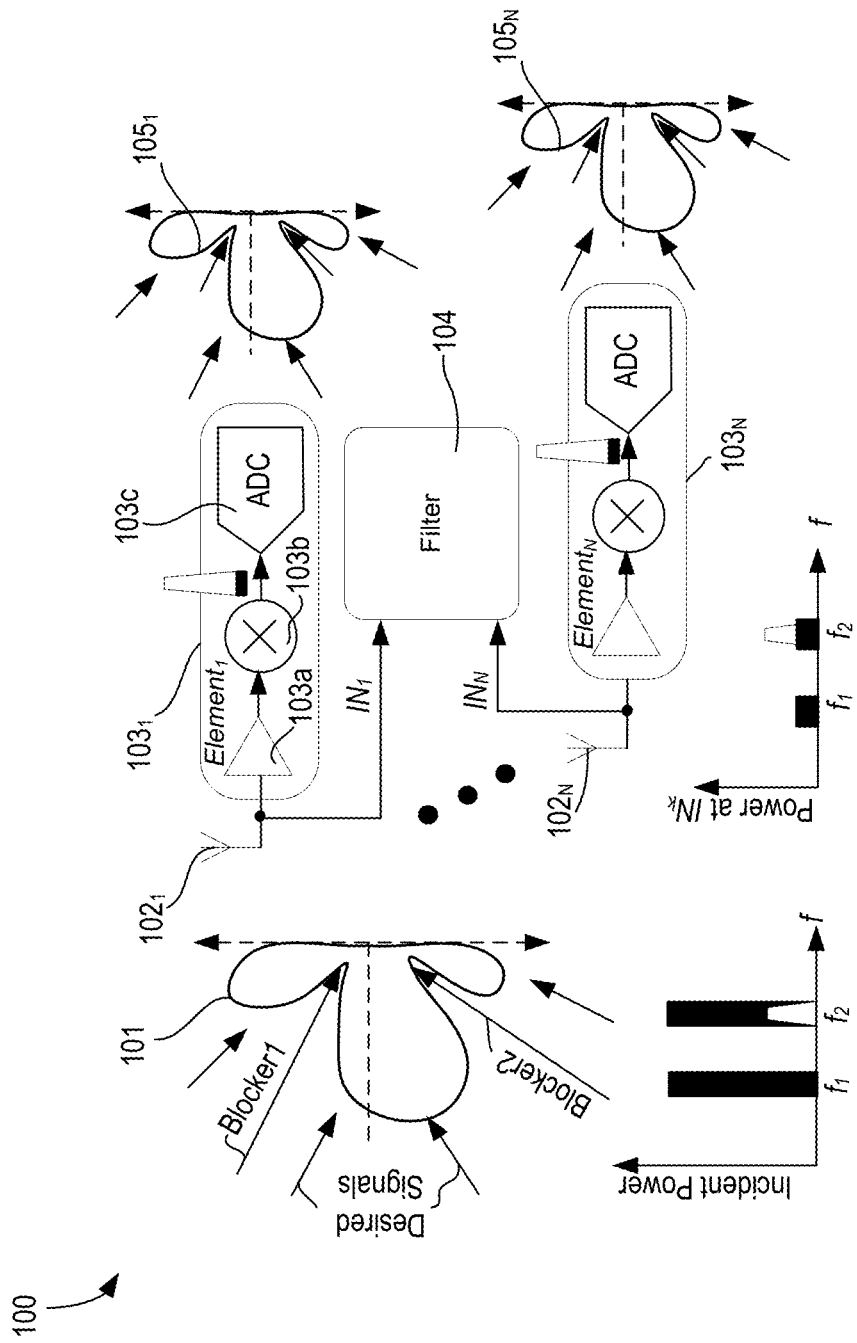
FIG. 1 illustrates an apparatus with spatio-spectral filtering at an RF input to attenuate multiple blockers (both out-of-band and in-band at specific angles of incidence) which reduces block levels at an input of an analog-to-digital converter (ADC) enabling subsequent digital beamforming, according to some embodiments of the disclosure.

FIG. 1 illustrates apparatus 100 for spatio-spectral filtering at an RF input 101 to attenuate multiple blockers (both out-of-band and in-band at specific angles of incidence) which reduces block levels at an input of an analog-to-digital converter (ADC) enabling subsequent digital beamforming, according to some embodiments of the disclosure. Here, blockers are illustrated as Blocker1 and Blocker2 with light shaded gray text and arrows.

Apparatus 100 comprises multiple antennas $102_1$-$102_N$, multiple receivers $103_1$-$103_N$, and filter 104. Each receiver may include a low noise amplifier (LNA) 103a, mixer 103b, and an ADC 103c.

In some embodiments, each antenna (e.g., $102_1$) may comprise one or more directional or omnidirectional antennas, including monopole antennas, dipole antennas, loop antennas, patch antennas, microstrip antennas, coplanar wave antennas, or other types of antennas suitable for transmission of Radio Frequency (RF) signals. In some multiple-input multiple-output (MIMO) embodiments, antennas $102_1$-$102_N$ are separated to take advantage of spatial diversity.

ADCs, such as ADC 103c, are apparatuses that convert an analog signal continuous physical quantities (e.g., voltages) to a digital signal with digital numbers that represent the amplitude of the physical quantities. Here, an analog signal is any continuous signal for which the time varying feature (variable) of the signal is a representation of some other time varying quantity, i.e., analogous to another time varying signal. Conversely, a digital signal is a physical signal that is a representation of a sequence of discrete values (a quantified discrete-time signal), for example of an arbitrary bit stream, or of a digitized (sampled and analog-to-digital converted) analog signal.

Any suitable ADC may be used to implement ADC 103c. For example, ADC 103c is one of: direct-conversion ADC (for flash ADC), two-step flash ADC, successive-approximation ADC (SAR ADC), ramp-compare ADC, Wilkinson ADC, integrating ADC, delta-encoded ADC or counter-ramp, pipeline ADC (also called subranging quantizer), sigma-delta ADC (also known as a delta-sigma ADC), time-interleaved ADC, ADC with intermediate FM stage, or time-stretch ADC. For purposes of explaining the various embodiments, ADC 103c is considered to be flash ADCs.

The PSNF approach of various embodiments is insensitive to mixer sequence overlap and hence, it can be scaled to higher number of blockers with technology scaling. Prior N-path tunable notch filters utilize N-phase non-overlapping local oscillator (LO) pulses (NOP) to drive mixer switches. Additionally, prior N-path tunable notch filters create a high input impedance at notch frequency leading to high blocker voltage swing at the input.

The filter of some embodiments can be used to attenuate two blockers, one at frequency $f_1$ and another at frequency $f_2$ with some angle of incidence. In the presence of any spatial/spectral blocker, the dynamic range required from ADC 103c to establish robust communication with desired signal is high and causes increase in power consumption. The notch filter of some embodiments can be used to implement either spectral notch filter or spatial notch filter at block frequency/angle of incidence. Due to the action of the notch filter, the blockers see low impedance at each antenna interfaces in the MIMO (multiple input multiple output) receiver. The notch filter of some embodiments also attenuates the blockers even before the receiver input $IN_k$.

The outputs of all receivers are used to form digital beam to receiver signals from all direction of arrival. In the presence of proposed filter, the signal arriving from blocker direction is attenuated. Therefore, at the output of ADC, signals are received from all the directions with equal gain except in the blocker's angle of arrival direction and shown as $105_{1-N}$ for each ADC output. These outputs can be used to extract signals from all direction using digital beam forming technique in a MIMO receiver.

Figure 2B:
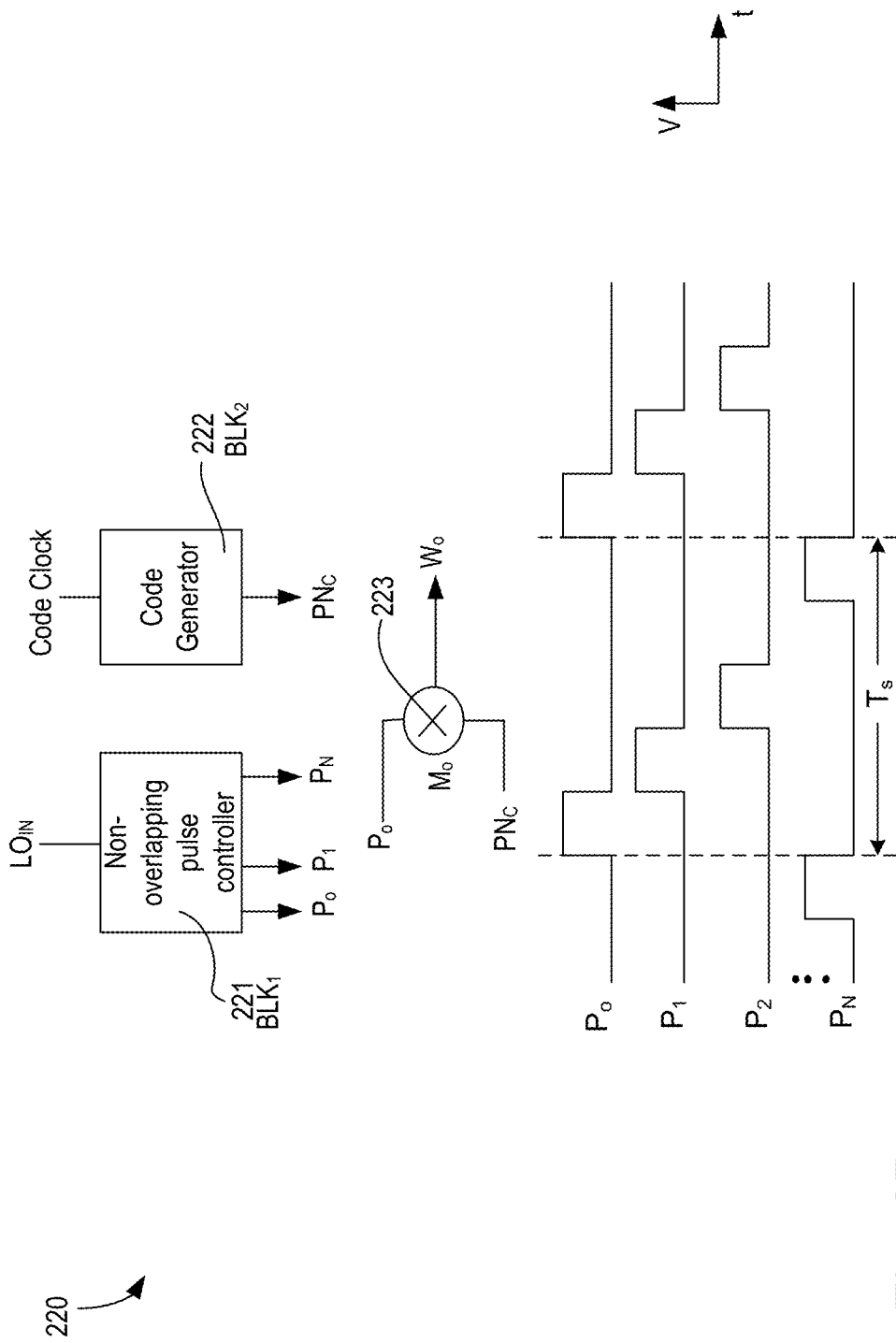

FIGS. 2A-B illustrate a code-domain receiver implementation using N-path filters, and associated control signals and apparatus, in accordance with some embodiments. The switches ($S_0$, $S_1$, ... $S_N$) are coupled to an Antenna (ANT) and are driven by sequences ($W_0$, $W_1$, ..., $W_N$) which are generated by a combination of non-overlapping pulses ($P_0$, $P_1$, ... $P_N$) and pseudo-random (PRN) or pseudo noise (PN) codes, according to some embodiments of the disclosure. Here, $T_s$ is the period of the non-overlapping pulses. $T_s$ defines the period of the carrier frequency and is set by the frequency of the blocker.

In some embodiments, each non-overlapping pulse (e.g., one of $P_0$, $P_1$, ... $P_N$) is multiplied using a multiplier 223 with PN code ($PN_c$) to generate switch control output W. For example, non-overlapping pulse $P_0$ is multiplied with $PN_c$ to generate $W_0$ which controls switch $S_0$. Other $W_i$ can be generated using similar techniques. Here, Block 1 ($BLK_1$) 221 which converts an LO input to non-overlapping pulses ($P_0$, $P_1$, ... $P_N$), in accordance with some embodiments. FIG. 2B also shows Block 2 ($BLK_2$) which receives a Code Clock and generates it using PRN or PN codes ($PN_c$). The PRN (same as PN) codes themselves can be a part of well-known codes such as M-sequences (maximal length sequences), Gold Codes, Kasami codes, Barker codes, etc., in accordance with some embodiments. The switches of the filter drive a combination of inductors, capacitors ($C_0$, ... $C_N$) and resistors ($R_0$ ... $R_N$), in accordance with some embodiments.

Figure 3:
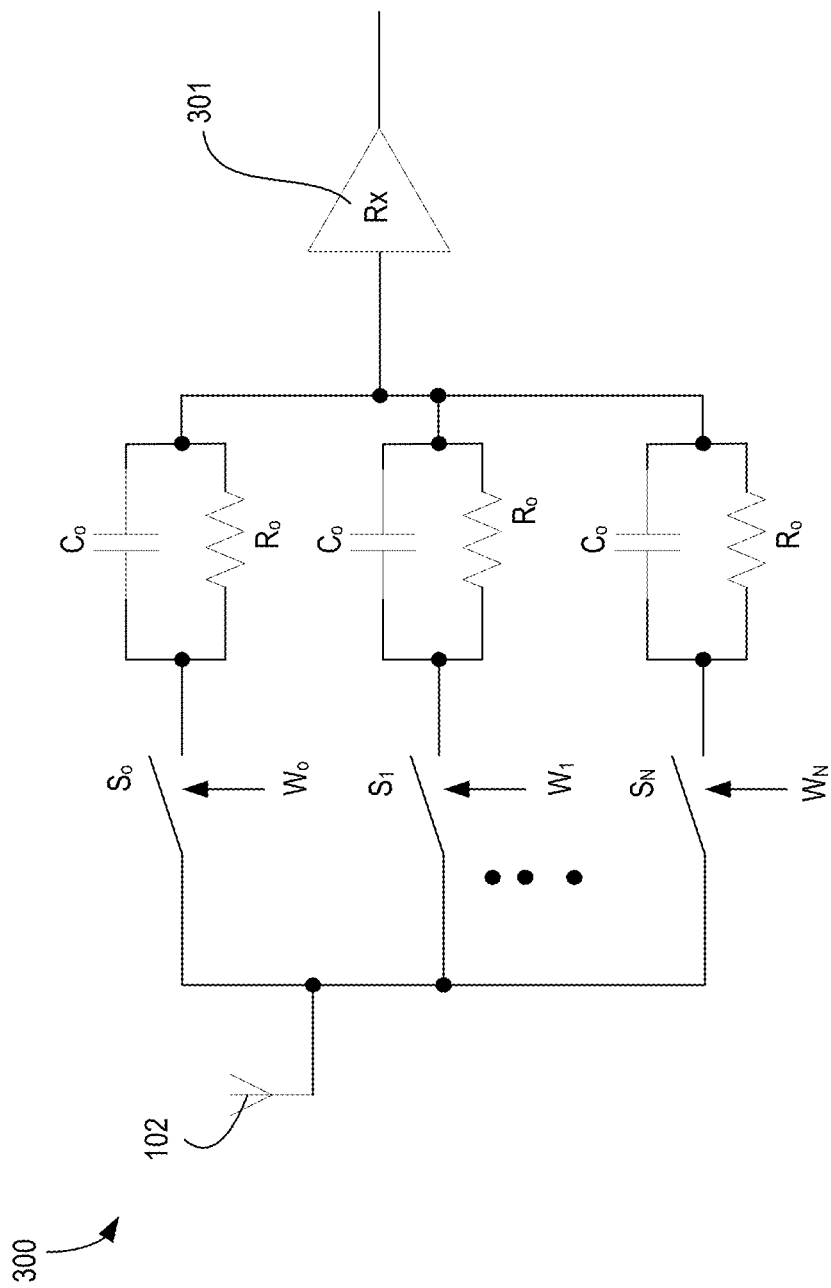
FIG. 3 illustrates a frequency-domain/code-domain notch filter implemented using an N-path filter, in accordance with some embodiments.

FIG. 3 illustrates a frequency-domain/code-domain notch filter 300 implemented using an N-path filter, in accordance with some embodiments. In some embodiments, filter 300 is connected in series with the receiver (RX) 301. In some embodiments, RX 301 can reject certain non-overlapping pulses or code modulated signals at the RX input. In some embodiments, the switches are driven by sequences ($W_0$, $W_1$, ..., $W_N$) generated by a combination of non-overlapping pulses and pseudo-random codes as discussed with reference to FIGS. 2A-B. In some embodiments, the pseudo-random codes themselves can be a part of well-known codes such as M-sequences (maximal length sequences), Gold Codes, Kasami codes, Barker codes, etc., in accordance with some embodiments.

Figure 4:
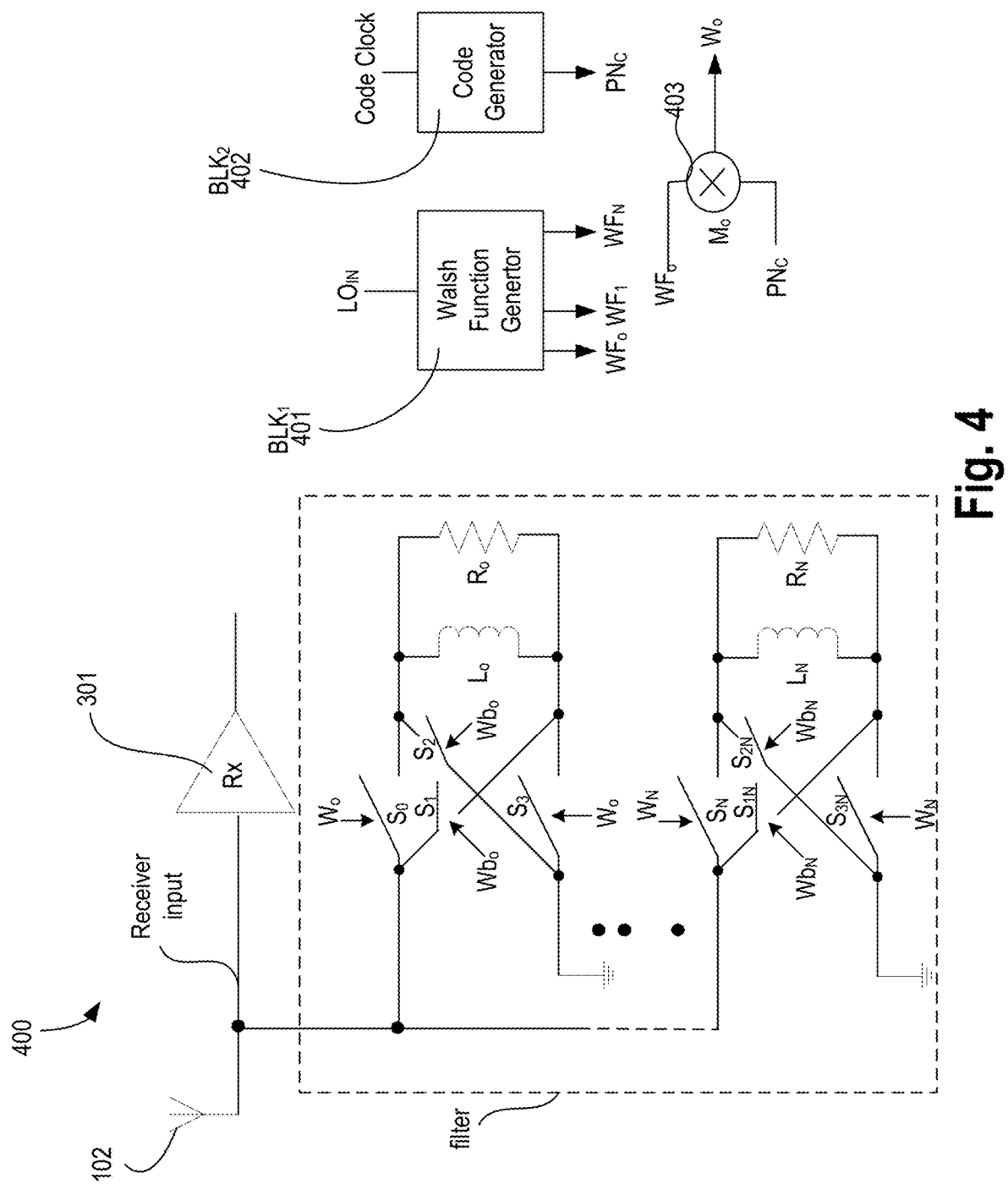
FIG. 4 illustrates a frequency-domain/code-domain parallel notch filter implemented using an N-path filter, in accordance with some embodiments.

FIG. 4 illustrates an apparatus 400 with frequency-domain/code-domain parallel notch filter implemented using an N-path filter, in accordance with some embodiments. In some embodiments, the notch filter is configured as an array. In some embodiments, the array uses Walsh function sequence mixing and impedance translation of passive mixers. In some embodiments, the filter of FIG. 4 is connected in parallel with RX 301. In some embodiments, the switches (e.g., $S_0$, $S_1$, $S_2$, $S_3$ through $S_N$, $S_{1N}$, $S_{2N}$, $S_{3N}$) of the filter drive a combination of inductors ($L_0, \ldots L_N$) and resistors ($R_0 \ldots R_N$). RX 301 can reject certain frequency signals or certain code-modulated signals at the receiver input. In some embodiments, the switches are driven by sequences ($W_0, W_1, \ldots, W_N$) generated by Walsh-Functions or a combination of non-overlapping pulses and pseudo-random codes.

Here, Block 1 (BLK$_1$) 401 converts an LO input (LO$_{IN}$) to Walsh-Functions (WF$_0$, WF$_1$, ... WF$_N$), while Block 2 (BLK$_2$) 402 receives a Code Clock and generates it using PRN or PN codes (PN$_c$). In some embodiments, each Walsh-Function (e.g., one of WF$_0$, WF$_1$, ... WF$_N$) is multiplied using a multiplier 403 with PN code (PN$_c$) to generate switch control output W. For example, Walsh-Function WF$_0$ is multiplied with PN$_c$ to generate W$_0$ which controls switch S$_0$. In some embodiments, the pseudo-random codes (e.g., PRN or PN) themselves can be a part of well-known codes such as M-sequences (maximal length sequences), Gold Codes, Kasami codes, Barker codes, etc., in accordance with some embodiments.

Figure 5:
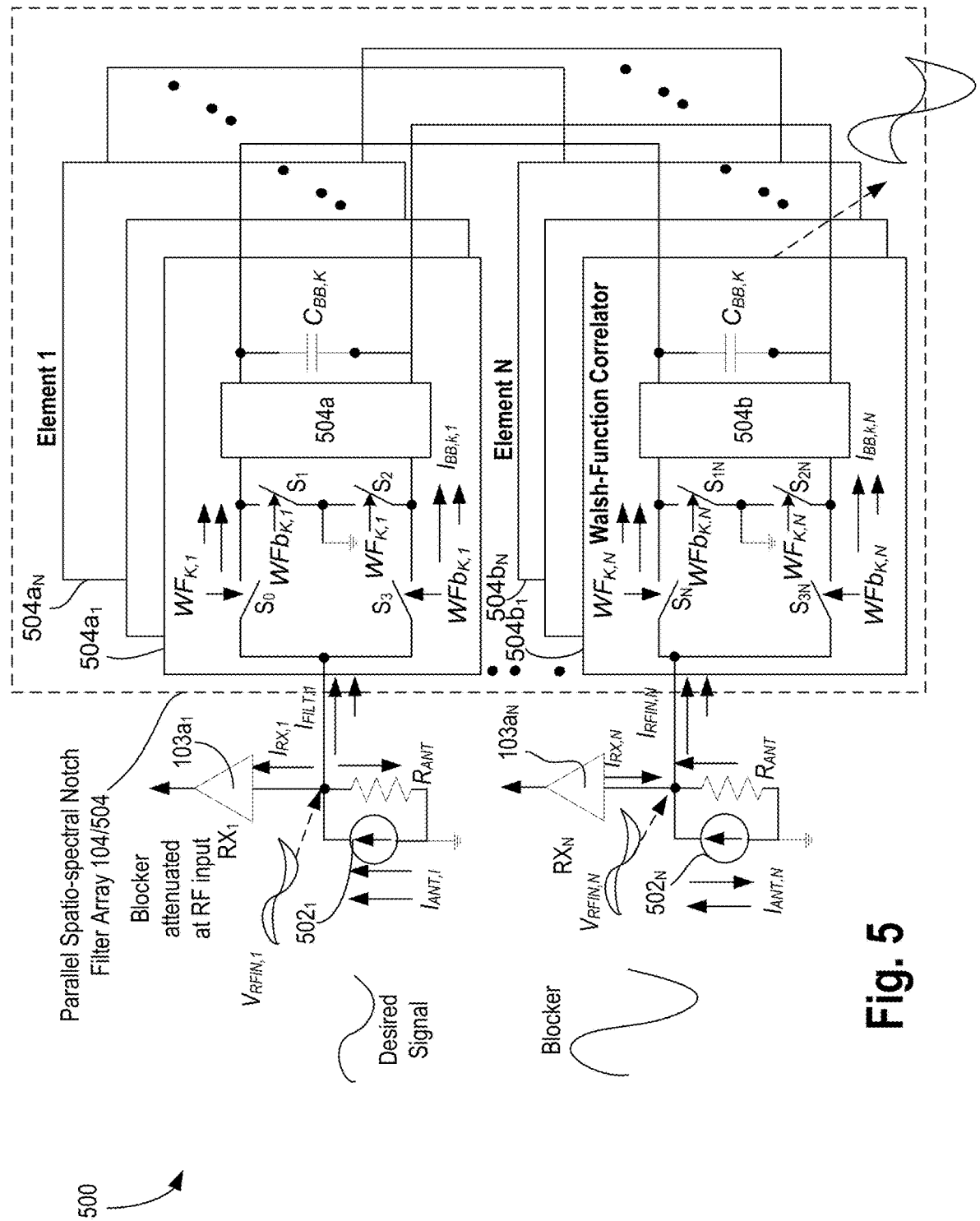
FIG. 5 illustrates a reconfigurable RX architecture for parallel spatio-spectral notch filtering (PSNF), in accordance with some embodiments.

FIG. 5 illustrates a reconfigurable RX architecture 500 for parallel spatio-spectral notch filtering (PSNF), in accordance with some embodiments. Architecture 500 comprises antenna models 502$_{1-N}$ (e.g., to model antennas 102$_{1-N}$), receivers RX$_{1-N}$ 103a$_{1-N}$, and parallel spatio-spectral notch filter array 104/504. In some embodiments, the antenna models 502$_{1-N}$ comprise a current source providing I$_{ANT}$ and antenna resistance RANT. In some embodiments, parallel spatio-spectral notch filter array 104/504 comprises sets of Walsh-Function Correlator Elements 1 (e.g., 504a$_1$-504a$_N$) through sets of Walsh-Function Correlator Elements N (504b$_{1-N}$).

In some embodiments, in the PSNF approach each set of element comprises switches (e.g., S$_{0-3}$ in element 1 504a$_1$, and S$_{N-3N}$ in element N 504b$_1$) which are driven by WF-sequence (e.g., WF signals including WF$_k$ and WFb$_k$, where WFb$_k$ is an inverse of WF$_k$) instead of NOP. In some embodiments, each set of switches (or at least one set of switches) and baseband gyrator 505 and capacitor C$_{BB}$ can be considered to be a correlator that senses RF voltage and return current based on the projection of the RF input voltage on a basis function determined by the mixer switches.

In some embodiments, an input signal that leads to low baseband voltage on C$_{BB,K}$ (black as opposed to light gray) leads to small baseband current, I$_{BB,K}$ and small RF current, I$_{FILT}$. This translates to a high PSNF input impedance and hence no filtering. However, a blocker signal that is correlated with the mixer switching signals leads to a non-zero voltage on C$_{BB,K}$ (light gray) and hence to gyrator output currents that are up-converted with I$_{FILT}$ following antenna current I$_{ANT}$. This creates a low RF impedance, attenuating RF input voltage.

Each PSNF element (e.g., 504a$_{1-N}$) comprises four correlators in this implementation, in accordance with some embodiments. Here, Walsh function (WF) sequences like the Fourier series, are well known as a complete orthogonal basis system to represent a signal.

In the PSNF approach of FIG. 5, the switches (e.g., S$_{0-3}$ with reference to 504a$_1$) are driven by WF sequence instead of NOP. Each set of switches and baseband gyrator/capacitor (e.g., 504a and C$_{BB,K}$) can be considered to be a correlator that senses RF voltage and returns current based on the projection of the RF input voltage on a basis function determined by the mixer switches. An input signal that leads to low baseband voltage on capacitor C$_{BB,K}$ leads to small baseband current, I$_{BB,K}$ and small RF current, I$_{FILT}$. This translates to a high PSNF input impedance and hence no filtering. However, a blocker signal that is correlated with the mixer switching signals leads to a non-zero voltage on capacitor C$_{BB,K}$ and hence to gyrator output currents that are up-converted with current I$_{FILT}$ following antenna current I$_{ANT}$. This creates a low RF impedance, attenuating RF input voltage.

Each PSNF element (e.g., Element 1 through Element N) comprises four correlators in this implementation. Notably, Walsh function sequences (WF-seq) like the Fourier series, are well known as a complete orthogonal basis system to represent a signal (sal(i) and cal(i) in FIG. 6D). In some embodiments, WF-seq are applied to the switching mixers (as opposed to NOP) for the following reasons: i) similar to N-phase NOP LO, WF-seq orthogonality implies that passive mixers driven by WF-seq can be connected together at RF without scaling and notch depth is increased with higher order WF-seq; ii) unlike NOP, each correlator in FIG. 5 is always connected to the RF port with the WF-seq approach ensuring a current path for the baseband current; iii) since the correlation for a sinusoid input with some WF-seq (e.g., wal(0), cal(2), sal(2), sal(4) in FIG. 6D) results in zero output if both have the same period T0, correlation with those sequences is not required; and iv) harmonic properties of the WF-seq filter are also equivalent to NOP N-path filter In some embodiments, spatio-spectral filtering can be achieved by connecting capacitors corresponding to one set of correlators across elements. For example, assume that the WFseq are in-phase in all elements, then a blocker with broadside AoI results in constructive addition on capacitor C$_{BB,K}$. This leads to currents, I$_{BB,K}$ at all gyrator outputs, causing low RF impedance and blocker notch filtering at all element inputs, in accordance with some embodiments. In some embodiments, if the desired signal AoI results in null voltage on capacitor C$_{BB,K}$, and hence null gyrator output, all RF inputs see a high PSNF impedance, and the desired signal is unaffected at all elements. In some embodiments, the AoI corresponding to notch filtering can be steered by changing the relative phase of the WF-seq applied to correlators in each element.

Figure 6A:
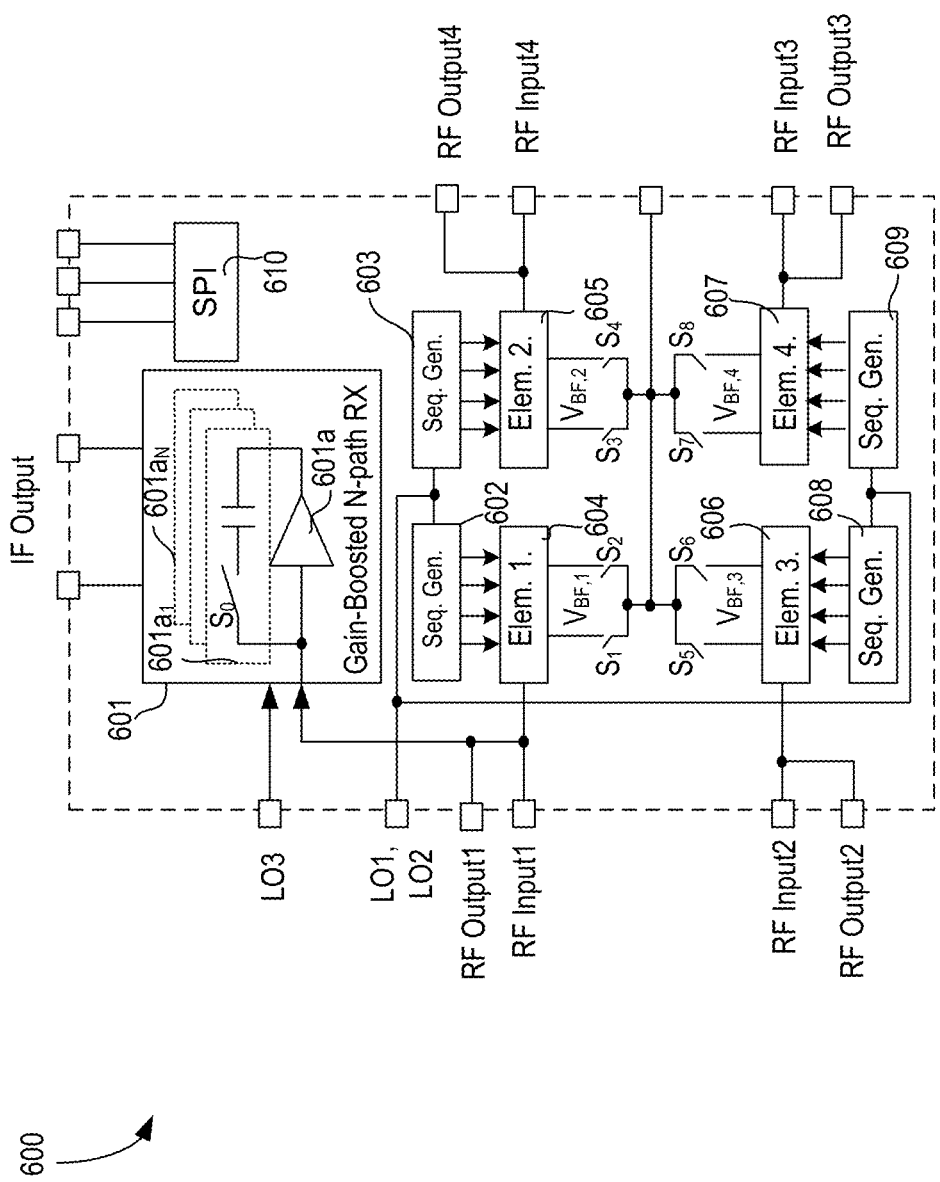
FIG. 6A illustrates $3^{rd}$ order and two $2^{nd}$ order Walsh function sequences (WF-seq), according to some embodiments.

FIG. 6A illustrates apparatus 600 with 3$^{rd}$ order and two 2$^{nd}$ order Walsh function sequences, according to some embodiments.

Apparatus 600 comprises switchable gain-boosted N-path RX 601. For example, switchable capacitors 601a$_1$ through 601a$_N$ are coupled to amplifier 601a. In some embodiments, apparatus 600 further comprises sequence generators 602, 603, 606, and 607; four notch filter elements 604, 605, 606, and 607, switches S$_{1-8}$, and Serial peripheral interface (SPI) 610 to provide access to various internal nodes. Here, the RF inputs are Input1, Input2, Input3, and Input4; and RF outputs are Output1, Output2, Output3, and Output4.

In some embodiments, each RF input is connected to an output of a notch filter and then it is available as RF output. In some embodiments, the baseband output of the filter can be shorted to create a spatial filter and can be disconnected to form a spectral notch filter. In some embodiments, the baseband output can be routed to off-chip to a printed circuit board (PCB), for example, and can be connected with notch filters on another die to realize a larger array to form a spatial notch with narrower beam width.

In some embodiments, the filter is designed to be highly configurable with its ability to program notch filter frequency, notch direction, filter order, bandwidth of the notch, etc. to optimize system performance. In some embodiments, SPI interface 610 is used to control all digital control signal including loading WF-seq to sequency generators (e.g., 602, 603, 608, and/or 609).

In some embodiments, two clocks LO1 and LO2 are used for two notches at two different frequencies. In some embodiments, Sequency gen block (e.g., 602, 603, 608, and/or 609) uses these clocks to generate the required WF-seq with appropriate frequency and phase shift to form a spatial notch. In some embodiments, the Sequency gen block (e.g., 602, 603, 608, and/or 609) can be programmed to use either clocks to form simultaneously two frequency notch filter or one frequency notch filter.

Figure 6B:
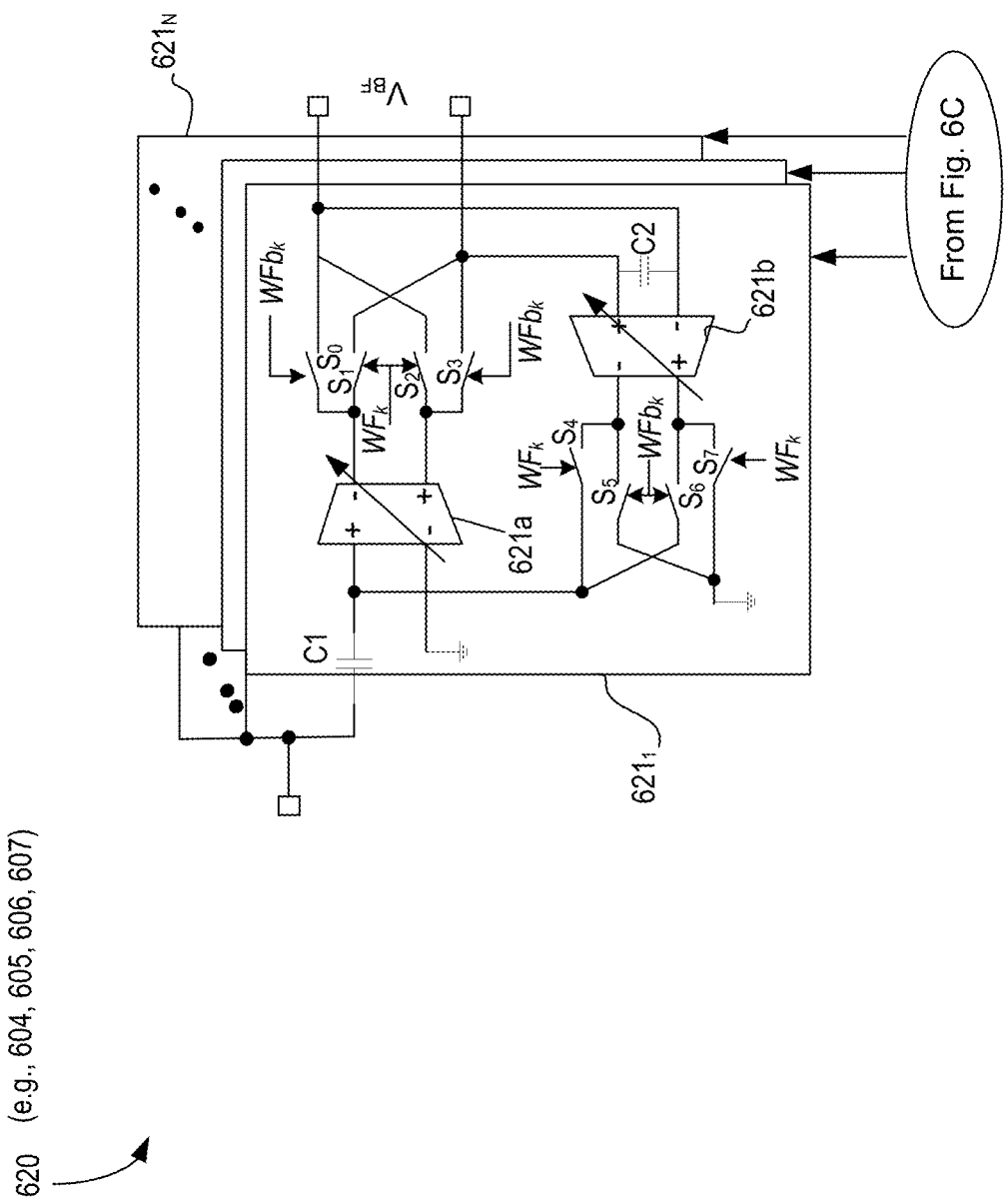
FIGS. 6B-C illustrate schematics of a four-element PSNF with four correlators in each element operating from a low frequency (e.g., 0.3 GHz) to a high frequency (e.g., 1.4 GHz), in accordance with some embodiments.
Figure 6C:
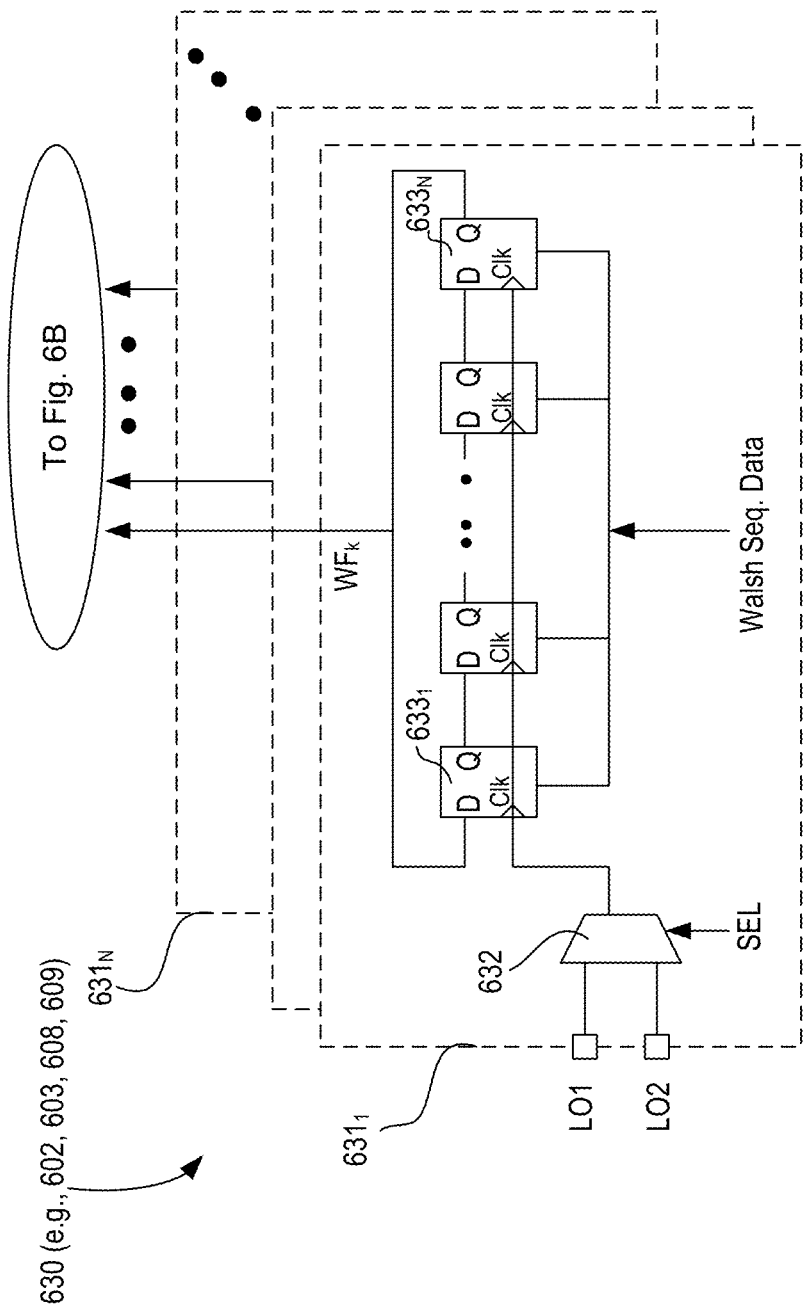

FIGS. 6B-C illustrate schematics 620 and 630, respectively, of a four-element PSNF with four correlators $621_1$-$621_4$ (but can be 'N' numbers of correlators) in each element operating from a low frequency (e.g., 0.3 GHz) to a high frequency (e.g., 1.4 GHz), in accordance with some embodiments. In some embodiments, schematic 620 comprises capacitors C1 and C2, circuits 621a/b and switches $S_0$-$S_7$ controlled by Walsh Function sequences $WF_K$ and $WFb_k$.

In some embodiments, capacitor C1 is used as a DC (direct current) block to isolate the DC bias of notch filter from the RF node. In some embodiments, capacitor C2 and two trans-conductors are used to implement effective inductance of the notch filter thus can be used to program the bandwidth. In some embodiments, the input to capacitor C1 is an RF input signal which is also routed as RF output in FIG. 6A. In some embodiments, the value of capacitor C1 is large as it is used as DC block.

In some embodiments, schematic 630 comprises Walsh Function sequence generators $631_1$-$631_4$ (but can be 'N' numbers of correlators), where each generator receives LO1 and LO2 signals and generates a Walsh Function sequence $WF_k$ using a chain of sequential units. In some embodiments, the sequential units are flip-flops $633_1$ through $633_N$ that receive clock input from one of LO1 or LO2 provided by multiplexer 632.

In some embodiments, the SEL signal is controlled through the SPI interface 610 and is used to select a desired LO signal to be used to create a notch filter. In some embodiments, Walsh Seq. is loaded parallel to the sequency generator using the SPI interface 210 through a computer interface. In some embodiments, the Walsh Seq. is loaded to a flip-flop using set and reset signals to the flip-flop. In some embodiments, the flip-flops are coupled together in a ring, such that the output Q of flip-flop $633_N$ to in the data input D of the first flip-flop $633_1$. The outputs $WF_k$ from each generator (e.g., from generator 631a) is provided to schematic 620 to control the switches.

Figure 6D:
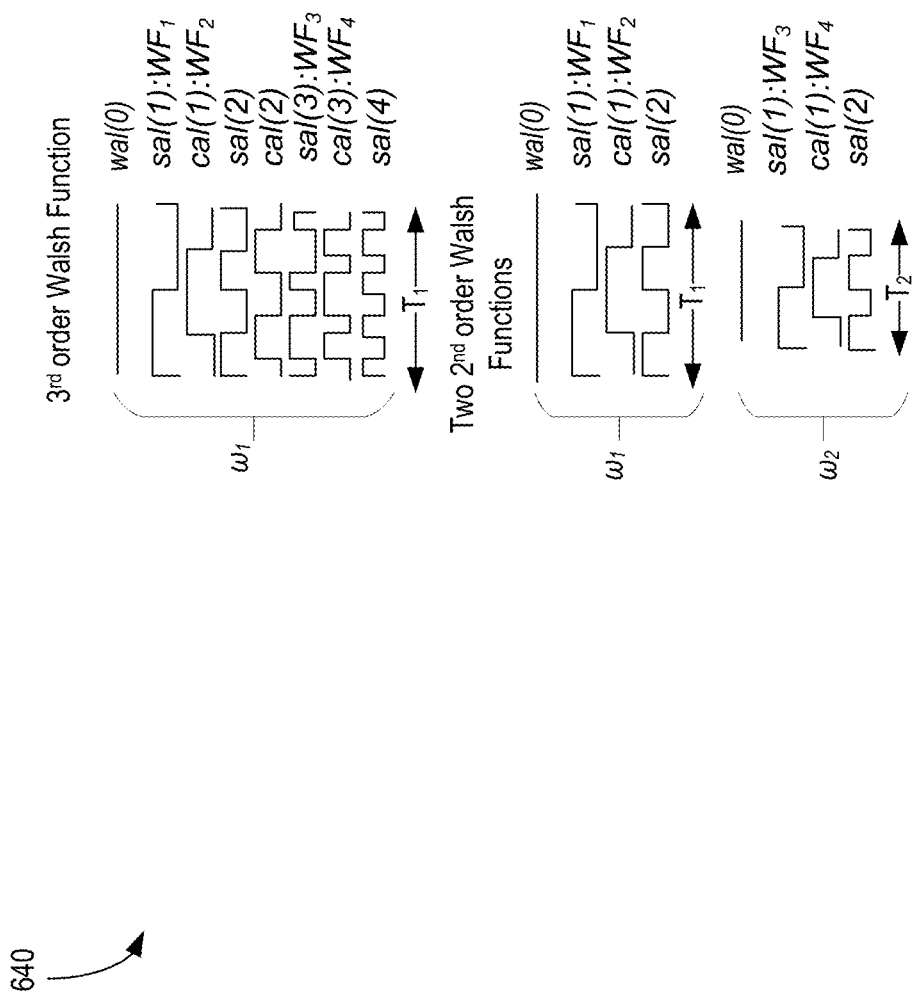
FIG. 6D illustrates waveforms of $3^{rd}$ order and two $2^{nd}$ order Walsh function sequences, according to some embodiments.

FIG. 6D illustrates waveforms 640 of $3^{rd}$ order and two $2^{nd}$ order Walsh function sequences, according to some embodiments. Similar to Fourier signal that consists of sinusoid and co-sinusoid signals, the Walsh function family consists of infinite series of binary value waveform. The first few signals of this family consists of infinite number of functions and can be denoted as wal, sal, and cal. These signals are produced at sequency generator output and used as clock driving switches in the notch filter, in accordance with some embodiments.

In some embodiments, WF-seq are applied to the switching mixers (as opposed to NOP) for the following reasons: i) similar to N-phase NOP LO, WF-seq orthogonality implies that passive mixers driven by WF-seq can be connected together at the RF without scaling and notch depth is increased with higher order WF-seq; ii) unlike NOP, each correlator in FIG. 5 is connected to the RF port with the WF-seq approach ensuring a current path for the baseband current; iii) since the correlation for a sinusoid input with some WF-seq (wal(0), cal(2), sal(2), sal(4)—gray in FIG. 6D) results in zero output if both have the same period To, correlation with those sequences is not required; and iv) harmonic properties of the WF-seq filter are also equivalent to NOP N-path filters.

In some embodiments, spatio-spectral filtering can be achieved by connecting capacitors corresponding to one set of correlators across elements (FIG. 5). For example, when the WF-seq are in-phase in all elements, a blocker with broadside AoI results in constructive addition on $C_{BB,K}$ (FIG. 5). This leads to currents, $I_{BB,K}$ at all gyrator outputs (e.g., outputs of 505), causing low RF impedance and blocker notch filtering at all element inputs. If the desired signal AoI results in null voltage on $C_{BB,K}$, and hence null gyrator output, all RF inputs see a high PSNF impedance, and the desired signal is unaffected at all elements. The AoI corresponding to notch filtering can be steered by changing the relative phase of the WF-seq applied to correlators in each element. In some embodiments, since the correlators in the PSNF correlate input voltage and return current, the approach is not affected by overlap between WF-seq across correlators. This is unlike prior art N-path filters with NOP that correlate current and return voltage, making them sensitive to overlap.

In some embodiments, the PSNFs insensitivity to overlap between basis functions allows arbitrary WF-seq to be applied at each correlator. For instance, if single-frequency/AoI $3^{rd}$-order WF-seq (FIG. 6D) are applied to the four correlators in each array element, a single frequency/AoI notch filter is created which is equivalent to 8-phase NOP filter. In some embodiments, a concurrent dual-frequency/AoI notch can be achieved by applying two $2^{nd}$-order WF-seq at two independent frequencies (FIG. 6D) to the four correlators in each element. In some embodiments, the gyrator capacitors $C_{BB,K}$ in the PSNF approach also capture the blocker signal for subsequent FFC.

In some embodiments, a gain-boosted N-path RX is included at one element output to demonstrate an RX following the PSNF. Since a $G_{M1}$ following the mixer, as in FIG. 5, leads to high flicker noise or capacitive switching losses, a translational approach is adopted with $G_{M1}$ preceding the mixer, in accordance with some embodiments. In some embodiments, the WF-seq applied to each LO are generated using a programmable shift register (e.g., flip-flops $633_{1-N}$) where the desired WF-seq is moved along the dual-edge shift register using a 4fLO clock. In some embodiments, a multiplexer allows two of the correlators to be shifted using a second LO (LO2) that is used to define the $2^{nd}$ notch frequency/AoI. 3-bit phase shift can be achieved by changing the relative phase of the WF-seq in shift registers corresponding to different elements. The architecture also supports traditional LO-path phase shifting for higher phase resolution.

FIGS. 7A-B illustrate plots 700 and 720 showing measured S11 parameters for one PSNF input/output pair with $3^{rd}$ order WF-seq for single frequency and two $2^{nd}$-order WF-seq for concurrent dual-frequency tunable notch, respectively, in accordance with some embodiments. In this example, the 4-element PSNF is implemented in a 65-nm CMOS and operates from 0.3 GHz to 1.4 GHz.

FIGS. 8A-B illustrate plots 800 and 820 showing measured S21 parameters from one of the RF inputs to the RF output in FIG. 6A for one PSNF input/output pair with $3^{rd}$-order WF-seq for single frequency and two $2^{nd}$-order WF-seq for concurrent dual-frequency tunable notch, respectively, in accordance with some embodiments.

Figures 8D, 8E:
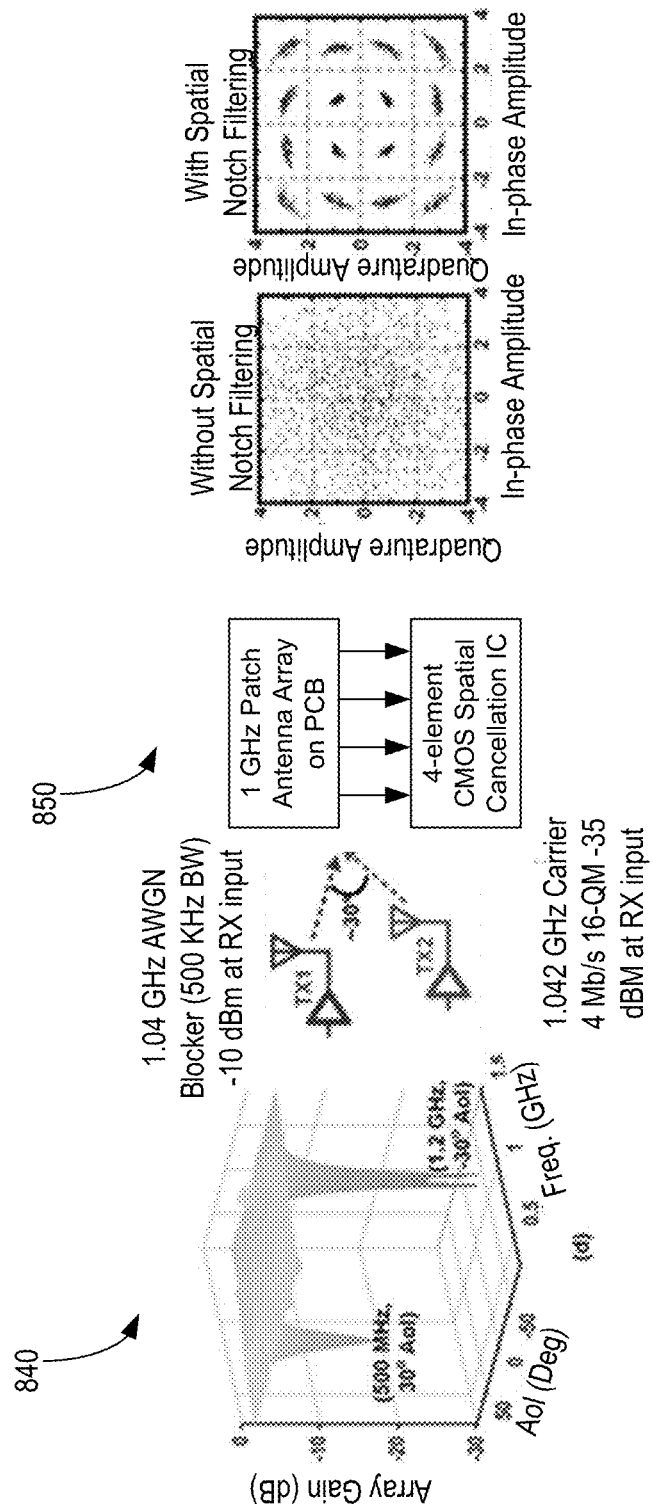

FIGS. 8C-D illustrate measured array gains 830 and 840 for a 4-element array for two settings demonstrating concurrent dual frequency/AoI notch filtering, respectively, in accordance with some embodiments. In this example, the PSNF achieves 14 dB and 20 dB spectral notch depth for $2^{nd}$ and $3^{rd}$ order WF-seq, respectively. Measured 4-element PSNF array factor at each output is shown across AoI/frequency for two frequency and relative phase shift settings of WF-seq, demonstrating concurrent dual-frequency/AoI spatio-spectral notch filtering (See, FIG. 8C and FIG. 8D). The gain-boosted N-path RX connected to Element 1 in FIG. 6A measured approximately 42-dB gain and NF of approximately −2.5 dB to 3.9 dB. Measured NF across notch frequency demonstrates equivalent 1-element NF of 5.3 dB to 7.5 dB. The measured RX OIP3 (output third order intercept point) is approximately 28 dBm with the PSNF enabled and configured for dual-frequency notch.

FIG. 8E illustrates measured constellation 850 with and without notch filtering for wireless test setup with in-band −10 dBm AWGN (additive white Gaussian noise) blocker and a −35 dBm 16 QAM (quadrature amplitude modulation) modulated desired signal at the RF input, in accordance with some embodiments. The constellation before and after the spatial blocker filtering in FIG. 8E demonstrates the efficacy of the notch filtering approach of some embodiments.

Figure 9:
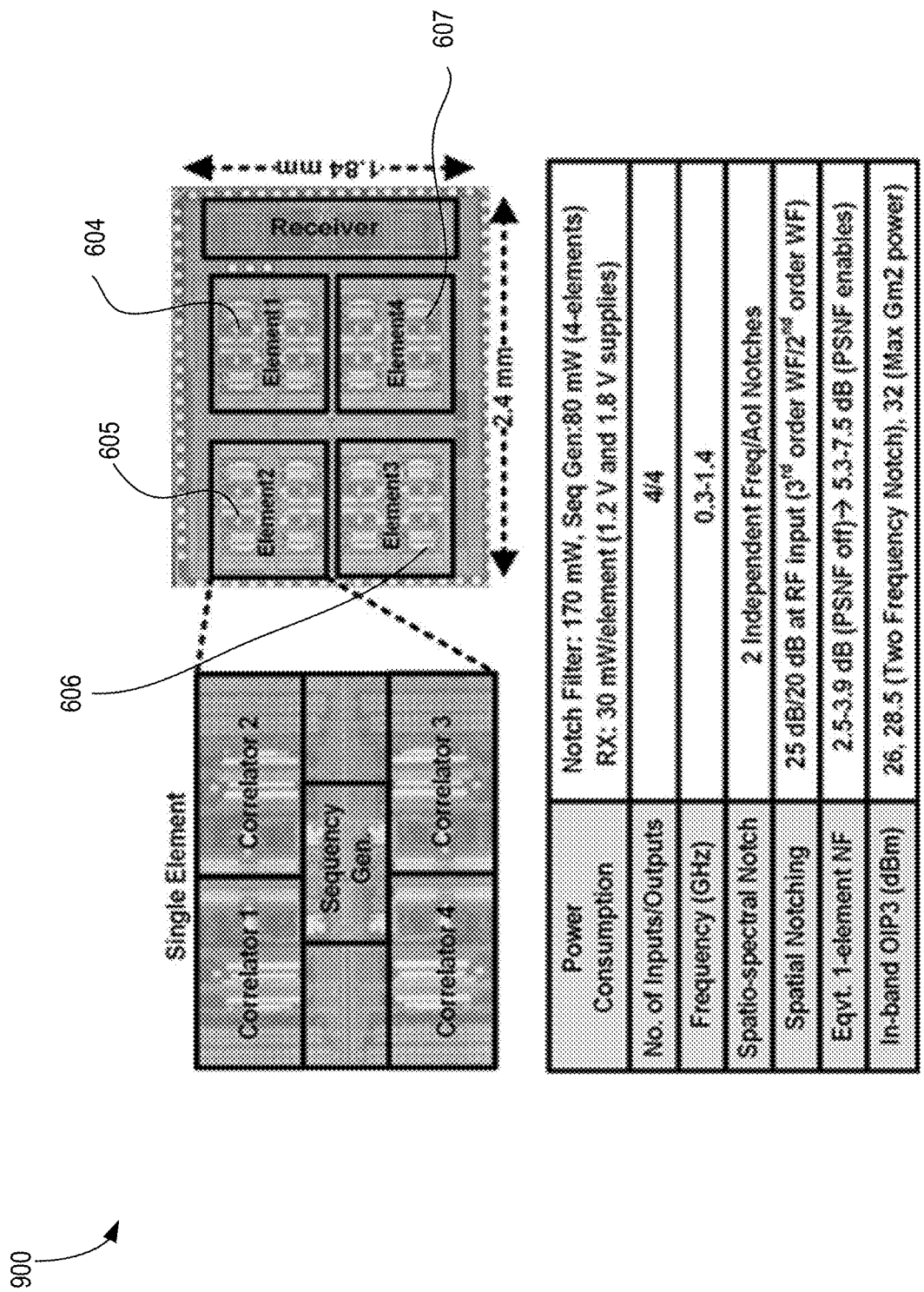
FIG. 9 illustrates a die photo of an integrated circuit (IC) having a 4-element PSNF and performance summary, in accordance with some embodiments.

FIG. 9 illustrates a die photo 900 of an integrated circuit (IC) having a 4-element PSNF and performance summary, in accordance with some embodiments. Here, the IC has extensive programmability in baseband gyrators/capacitors in FIG. 6A, which increases area. The core element area is 0.48 mm$^2$. Additional measurements demonstrating tiling of two ICs together to achieve 8-element PSNF array have also been performed demonstrating scalable spatio-spectral filtering at RF input in DBF arrays.

Figure 10:
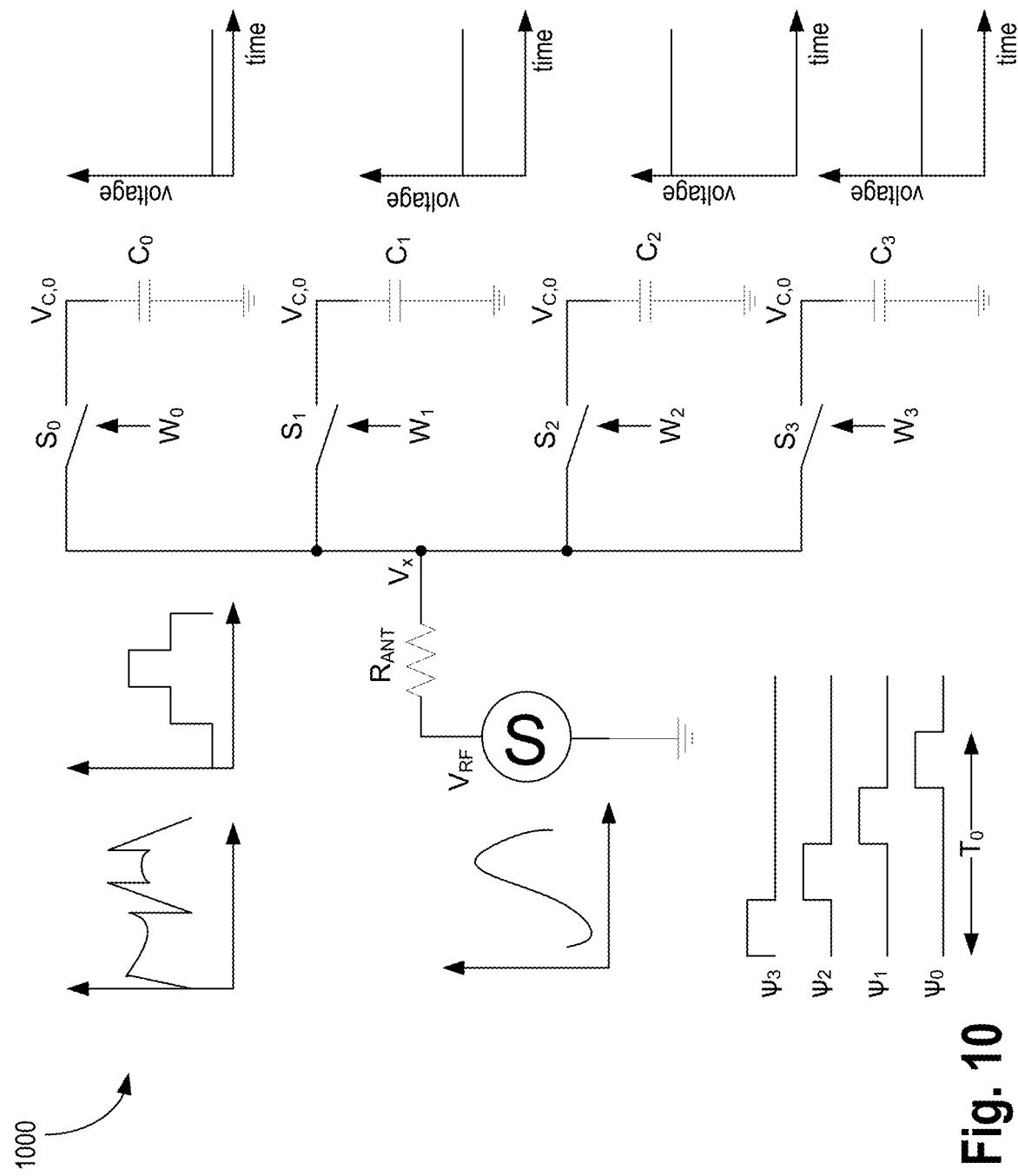
FIG. 10 illustrates an N-path mixer based receiver (RX) with non-overlapping pulse local oscillator (LO), in accordance with some embodiments.

FIG. 10 illustrates a code-domain N-path mixer 1000 based receiver (RX) with non-overlapping pulse local oscillator (LO), in accordance with some embodiments.

In the N-path passive mixer driven by the non-overlapping LO pulses, the switch and baseband filter correlate input RF current with the LO signal. The baseband voltage, VC,k (t) is given by:

$$V_{C,K}(t) = \frac{1}{R_A C} \int \left( V_{RF} - \sum V_{C,J} W_J \right) W_K dt \quad (1)$$

where, $R_A = R_{ANT} + R_{SW}$, and where $R_{ANT}$ is the resistance of the antenna, and where $R_{SW}$ is the resistance of the switch in the ON state. Orthogonal basis functions as switch signals (e.g., NOP pulses where $W_K = \phi_K$) result in the baseband capacitors developing voltages corresponding to the RF input projection on the basis functions. Since each path operates on the RF current, it is desirable to have no overlap between signals driving the switches to avoid charge sharing. Therefore, concurrent operation of parallel correlators driven by NOP at different frequencies is unfeasible.

Here, the following are assumed: a desired RX signal, $V_{RF}(t)$ with symbol rate, $B_R$ that is spread using a pseudo-noise (PN) code, $PN_{R1}$ with chip rate, $C_R = 1/T_C$, (code length, $M = C_R/B_R$) and translated to center frequency, $f_0$. In this case, if the LO signal applied to each switch is generated by multiplying the NOP with period, $T_0 = 1/f_0$, with a pseudo-noise sequence, $PN_{LO}$, $W_K$ is given by, $$W_K = \begin{cases} \varphi_K(t) & \text{for } PN_{LO}(t) = 1 \\ \varphi_K(t + \pi/\omega_0) & \text{for } PN_{LO}(t) = -1 \end{cases} \quad (2)$$

then the baseband output signal is given by, $$V_{C,K}(t) = \frac{1}{R_A C} \int \left( V_{RF} PN_{R1} - \sum V_{C,J} W_J \right) W_K dt \quad (3)$$

Therefore, $V_{C,K}(t)$ depends upon cross-correlation between $PN_{LO}$ and $PN_{R1}$. For $PN_{LO} = PN_{R1}$ (assuming synchronization), de-spreading occurs with $V_{C,K}(t)$ given by equation (1) (ignoring bandwidth constraints). In some embodiments, low cross-correlation between $PN_{LO}$ and $PN_{R1}$ leads to rejection. Impedance translation also occurs in the spectral/code-domain with input RF matching for signals at frequency $f_0$ that are spread with $PN_{R1}$ and RF mismatch for PN codes orthogonal to the $PN_{R1}$. In some embodiments, the PN code family can be selected based on auto-correlation (for synchronization) and cross-correlation (for interferer rejection) properties. While interferer rejection can be increased by using specific codes such as Gold codes, the rejection can be insufficient for TX SIRC (simple infrared transmitter code). In some embodiments, a technique is provided to select pairs of PN sequences that can provide high SIRC by leveraging a combination of PN and Walsh sequences.

Figure 11:
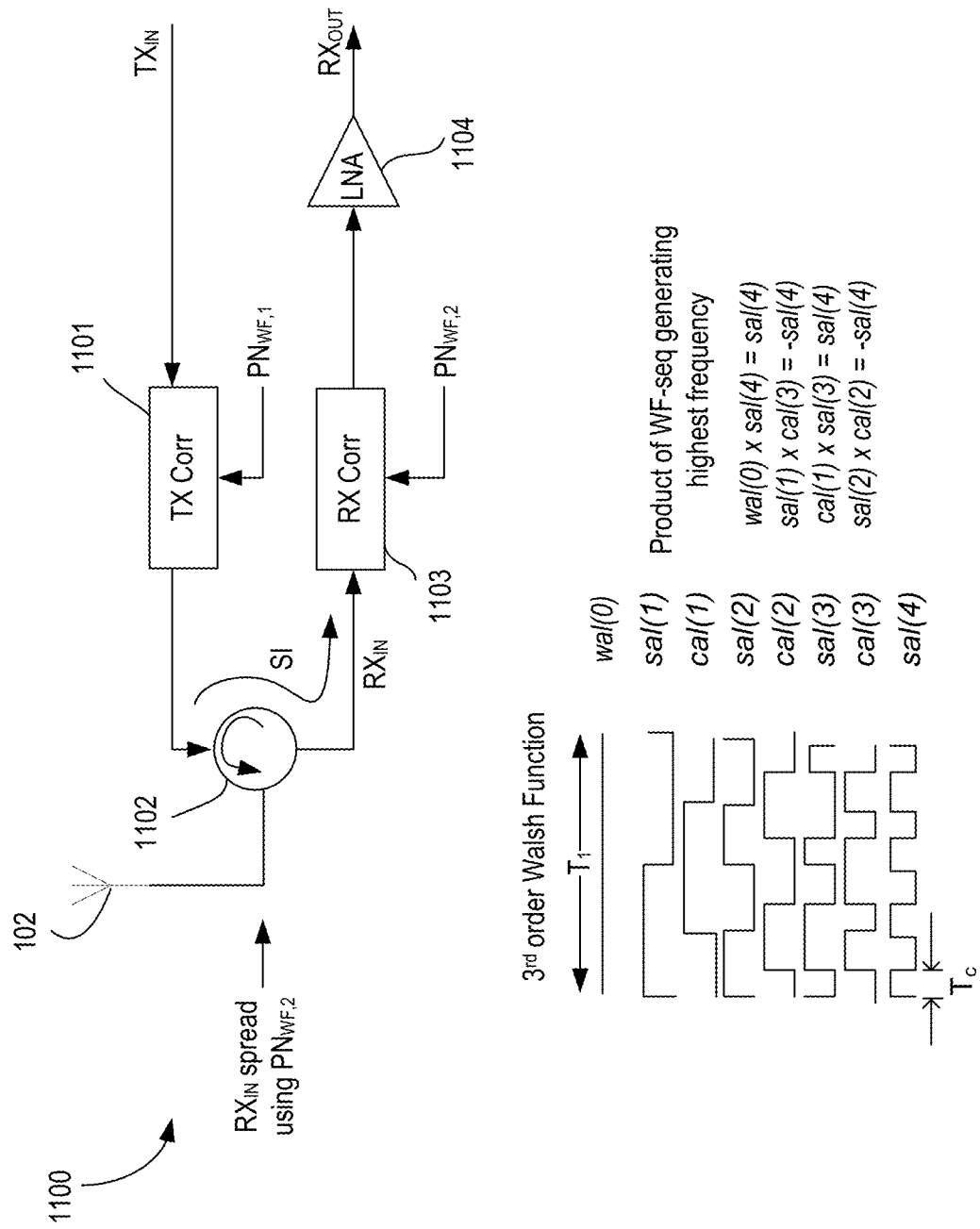
FIG. 11 illustrates a $3^{rd}$ order Walsh-function sequence (WF-seq) for a transmitter (TX) and a receiver (RX), in accordance with some embodiments.

FIG. 11 illustrates a $3^{rd}$ order Walsh-function sequence (WF-seq) for self-interference cancellation for a transmitter (TX) and a receiver (RX), in accordance with some embodiments.

In some embodiments, TX Correlator (Corr) 1101 is positioned in the transmitter, and is used to spread the signal intended for transmission. For example, the signal intended for transmission is spread by multiplying the transmitter input signal $TX_{IN}$ with the pseudo code $PN_{WF,1}$.

In some embodiments, block 1102 is a circulator which comprises of three terminals connected to the TX, RX and antenna 102. In some embodiment, block 1102 is used to isolate the transmit signal (e.g., output of block 1101) from the received signal $RX_{IN}$. In an ideal circulator, the transmitted signal from transmitter only appears at the antenna and signal received at the antenna terminal only appears at receiver. Thus, the circulator provides the required isolation between the transmitter and the receiver for them to operate simultaneously. The practical circulator, however, may suffer from limited isolation between its three terminals and some leakage transmitted signal may appear at receiver input $RX_{IN}$.

In some embodiments, block 1103 is a receiver correlator (RX Corr) which is used to de-spread the code modulated received signal in the receiver by multiplying the received signal with a pseudo code $PN_{WF,2}$.

Walsh-function sequences (WF-seq) are orthogonal sequences well suited for digital synthesis. Notably, a PN sequence multiplied by a WF-seq is also a PN sequence. Considering two PN sequences, $PN_{WF,1}$ and $PN_{WF,2}$, $$PN_{WF,1} = PN_1 \cdot sal(1); PN_{WF,2} = PN_1 \cdot cal(3) \quad (4)$$

where sal(1) and cal(3) are shown in FIG. 11 and $PN_1$ is a pseudo-noise sequence with chip rate, $C = 1/T_C$.

Assuming $PN_{WF,1}$ and $PN_{WF,2}$ are used as the spreading sequence for the TX and the desired RX signals $TX_{IN}$ and $RX_{IN}$, respectively. Hence, if $W_J$ applied to the mixers is generated using $PN_{WF,2}$, and assuming that the TX is synchronized to the de-spreading sequence $PN_{WF,2}$, the SI and desired RX at the baseband output are given by, $$V_{BB,SI} = V_{TX} \cdot PN_{WF,1} \cdot PN_{WF,2} = sal(4) \cdot V_{TX} \quad (5)$$

$$V_{BB,RX} = V_{RX} \cdot PN_{WF,2} \cdot PN_{WF,2} = V_{RX} \quad (6)$$

From equation (5), SI interaction with RX de-spreading code translates SI outside RX bandwidth, enables frequency-domain filtering in the N-path RX baseband. While equation (5) is analyzed for one combination of WF-seq, other WF-seq combinations (FIG. 11) lead to the same result, with higher-order WF-seq providing higher number of pairs.

Figure 12:
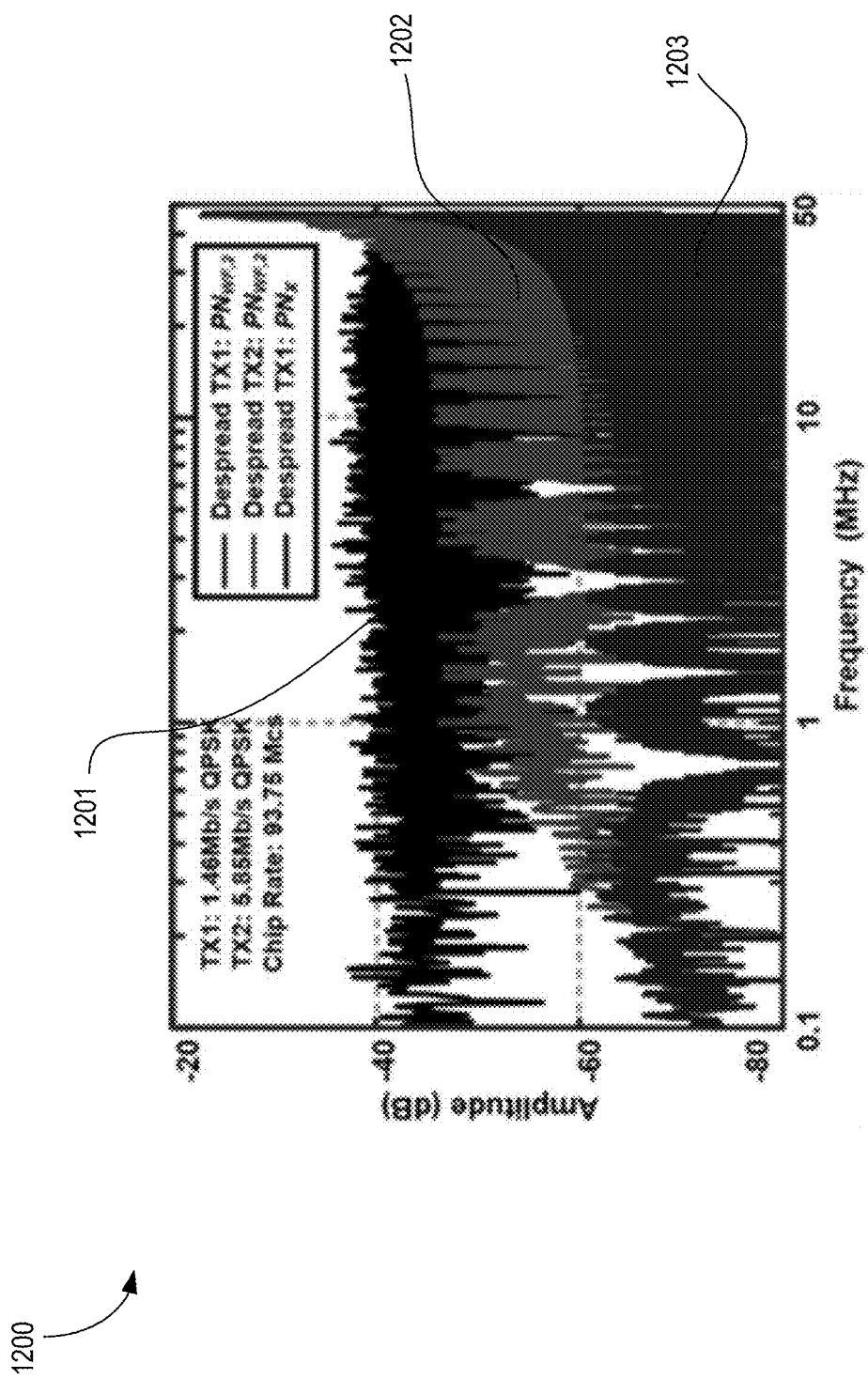
FIG. 12 illustrates a plot showing the SI at N-path RX output following de-spreading using PN code and WF-seq/PN code, in accordance with some embodiments.

FIG. 12 illustrates a plot 1200 showing the SI at N-path RX output following de-spreading using PN code and WF-seq/PN code, in accordance with some embodiments. Plot 1200 shows the SI after spreading and de-spreading for 1.46 Mb/s (TX1) and 5.85 Mb/s QPSK (TX2) signals spread with a chip rate of 93.75 Mchips/s (Mcs) using $PN_{WF,1}$.

The simulated baseband SI output following de-spreading with $PN_{WF,2}$ 1202 and 1203, and with another PN code, $PN_X$ 1201 is shown. Comparing $PN_{WF,2}$ and $PN_X$ for TX1, frequency filtering the SI output at the RX in the $PN_{WF,2}$ case leads to higher SIRC (for integration BW: 746 KHz, SIRC with $PN_X$: 17.7 dB and with $PN_{WF,2}$: 41.7 dB). A higher ratio between chip rate and symbol rate also leads to higher SIRC with 41.7 dBm SIRC for TX1 (BW: 746 KHz) compared to 29.6 dB for TX2 (BW: 5.85 MHz). The synchronization used between the TX and RX spreading codes implies that the TX code must also be aligned with the desired RX sequence using pilot signals similar to a CDMA (Code Division Multiple Access) RX.

Figure 13A:
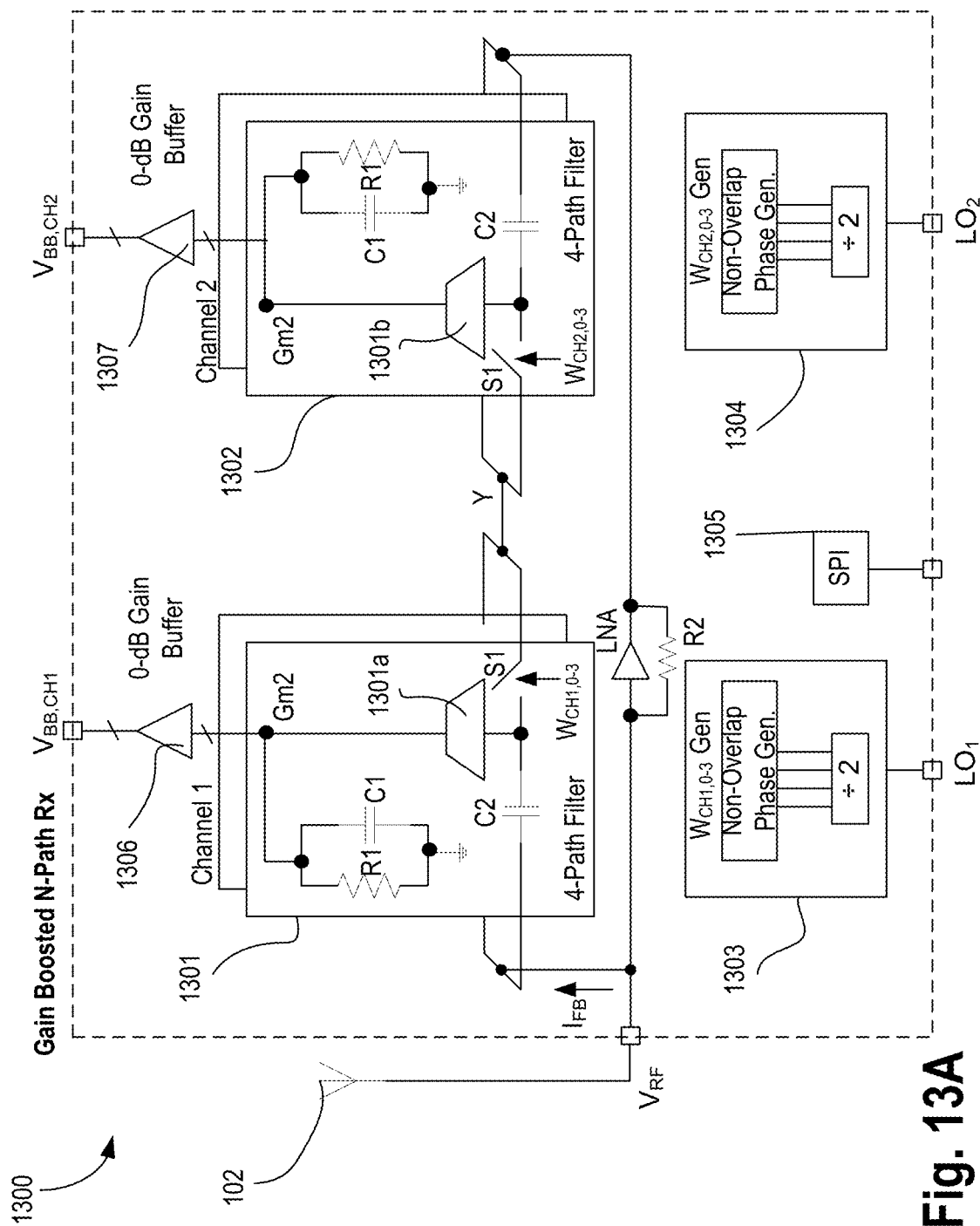

FIGS. 13A-C illustrate schematics 1300, 1320, and 1330, respectively, of a dual-correlator gain-boosted N-path RX (e.g., a code-domain RX), according to some embodiments of the disclosure.

The correlator-based approach of some embodiments is implemented using a gain-boosted N-path RX which comprises Channel 1 and Channel 2 4-path filters 1301 and 1302, respectively. In some embodiments, the 4-path filter 1301 comprises a parallel combination of resistor R1 and capacitor C1, trans-conductor 1301a, switch S1 controllable by $W_{CH1,0-3}$, and capacitor C2 coupled together as shown. In some embodiments, the 4-path filter 1302 comprises a parallel combination of resistor R1 and capacitor C1, trans-conductor 1301b, switch S1 controllable by $W_{CH2,0-3}$, and capacitor C2 coupled together as shown. In some embodiments, $W_{CH1,0-3}$ is generated by logic comprising circuit 1303 for non-overlap phase generation and divide-by-two circuitry which receives $LO_1$. Schematic 1320 illustrates the generation $LO_1$. In one example, $LO_1$ is generated by mixing of clock 1 ($CLK_1$) with $PN_{CH,1}$ by mixer or multiplier 1321. The output of multiplier 1321 is then compared by XOR 1323 with its delayed version delayed by delay circuitry 1322.

In some embodiments, $W_{CH2,0-3}$ is generated by logic comprising circuit 1304 for non-overlap phase generation and divide-by-two circuitry which receives $LO_2$. In some embodiments, $LO_2$ is generated by circuitry 1330 similar to schematic 1320 but using $CLK_2$ instead of $CLK_1$, and using $PN_{CH,2}$ instead of $PN_{CH,1}$. An SPI interface 1305 is provided to get access to internal nodes of the gain boosted N-path RX. In some embodiments, the RF input ($V_{RF}$) is received by an LNA which is coupled to a feedback resistor R2 such that the input of the LNA is also coupled to capacitor C2 of 1301 while the output of LNA is coupled to capacitor C2 of 1302. In some embodiments, a 0 dB Gain Buffer 1306 is coupled to the 4-Path filters 1301 to provide $V_{BB,CH1}$. In some embodiments, a 0 dB Gain Buffer 1307 is coupled to the 4-Path filters 1302 to provide $V_{BB,CH2}$.

In some embodiments, the current $I_{FB}$ passes through the switches S1 of filters 1301 and is available at node Y (ignoring capacitance to substrate). In some embodiments, another correlator 1302 can be placed in series for concurrent reception of two signals. In some embodiments, the correlators 1301 and 1302 in each channel are driven by different PN sequences, $PN_{CH1}$ and $PN_{CH2}$. Impedance translation leads to an input-match for the desired signals at LO frequency spread using $PN_{CH1}$ and $PN_{CH2}$ while other signals are rejected.

In some embodiments, two series correlators in the feedback path increases the effective switch resistance and hence presents trade-offs between loss and linearity. Rejection of undesired signals may require an equivalent RF current to be sourced by the LNA (Low Noise Amplifier) output. In some embodiments, higher series resistance R2 leads to larger voltage swing at the LNA output, limiting linearity. In some embodiments, increasing size of switches S1 increases parasitic capacitance and/or resistance that shunt RF current to substrate degrading high frequency operation. In one example, switch resistance of 15Ω is selected, achieving operation up to 1.4 GHz and 13 dBm OOB (out-of-band) IIP3 (third order intercept point).

In one example, the LNA is based on the design in providing approximately 20 dB gain up to 1.4 GHz, consuming 25 mW. Two four-path correlators are implemented in the feedback path. IQ buffer stages, following the baseband correlators, drive loads (e.g., 50Ω loads) with −0 dB gain. In this example, bandwidth of the N-path correlators and buffer stages are 5 MHz and 3.4 MHz respectively.

In some embodiments, PN code modulation of the LO signal is done off-chip. The PN-code chip rate (e.g., 93.75 Mcs) is significantly lower than RF frequency and hence an on-chip LO code modulation scheme consumes less power (e.g., less than 1 mW) in simulation.

Figures 14A, 14B, 14C:
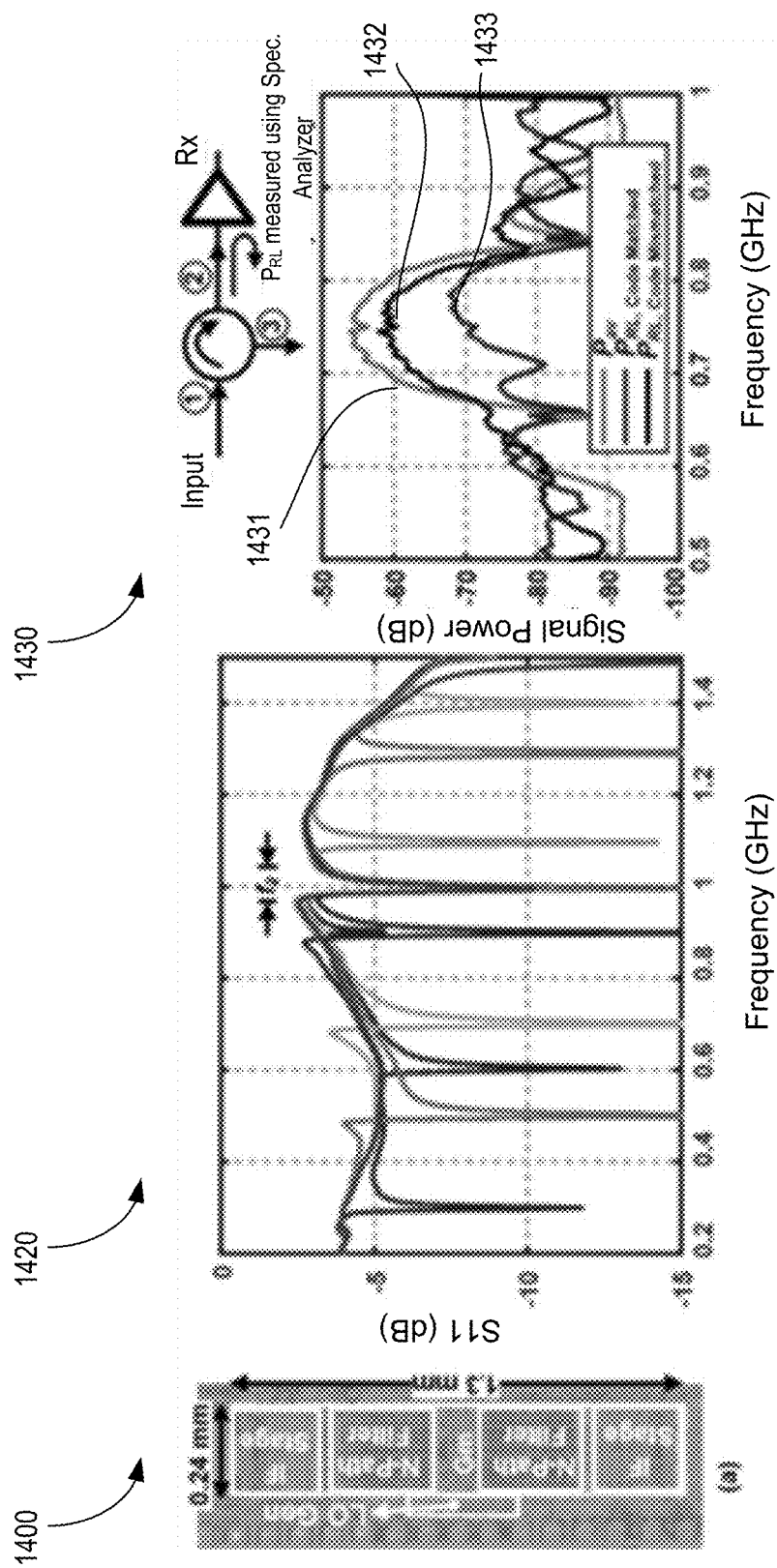
FIG. 14A illustrates a die photo of an integrated circuit (IC) of 65 nm CMOS N-path RX, in accordance with some embodiments.
FIG. 14B illustrates a plot showing measured S11 parameter when $W_{CH1}$ and $W_{CH2}$ in FIG. 13A are 4-phase NOP pulses (without code modulation) at two frequencies, f1 and f2.
FIG. 14C illustrates a plot showing measured available and reflected power for matched and mismatched de-spreading codes, in accordance with some embodiments.

FIG. 14A illustrates die photo 1400 of an integrated circuit (IC) of 65 nm CMOS N-path RX, in accordance with some embodiments. In this example, the IC occupies 0.31 mm$^2$ in a 65-nm CMOS.

FIG. 14B illustrates plot 1420 showing measured S11 parameters when $W_{CH1}$ and $W_{CH2}$ in FIG. 13A are 4-phase NOP pulses (without code modulation) at two frequencies, f1 and f2. Here, $f_2$ is held constant at 1 GHz while $f_1$ is varied. Here, while harmonic down conversion in N-path mixers precludes harmonic relationship between $f_1$ and $f_2$, concurrent LO-tunable dual-frequency match can be observed.

FIG. 14C illustrates plot 1430 showing measured available and reflected power for matched and mismatched de-spreading codes, in accordance with some embodiments. Here, an indirect code-domain matching measurement shown by waveforms 1431, 1432, and 1433 is performed using the circulator-based setup.

FIG. 15A illustrates plot 1500 showing measured RX gain and isolation between a first channel and a second channel, in accordance with some embodiments. The measured spectrum available at RX port 2 is compared to the measured spectrum at port 3 when de-spreading code in the RX is the same and is different from the spreading code for the input signal. The 10-dB higher reflected power when codes are different demonstrates signal reflection at the RF port, implying signal rejection at RF input.

The RX gain 1501 and 1502 for channels CH1 and CH2, respectively, is measured by applying 4-phase NOP pulses at 1 GHz and 0.6 GHz (FIG. 15A), with channels CH1 and CH2 achieving 35.5 dB and 38.5 dB gain, respectively (asymmetry due to frequency/position in feedback path). Leakage signal 1503 and 1504 from channels CH2 to CH1, respectively, is measured as the channel CH1 output with an RF input close to channel CH2 LO frequency. Measurements demonstrate 35 dB isolation. Measured RX NF (noise figure) is 2.5 dB to 4 dB (e.g., 0.3 MHz to 1.4 GHz) with measured −26 dBm in-band and +13 dBm OOB IIP3 (for 45 MHz and 91 MHz offset tones).

FIG. 15B illustrates plot 1520 showing measured two-tone SI at RX output following spreading and de-spreading, in accordance with some embodiments. Here, two waveforms 1521 and 1522 are shown. TX SIRC for a two-tone SI at 750 MHz that has been spread using $PN_{WF,1}$ is shown in FIG. 15B. De-spreading with $PN_X$ provides SI rejection as indicated by 1522. However, de-spreading with $PN_{WF,2}$ as shown by 1521 demonstrates signal translation to 46.9 MHz for chip rate 93.75 Mcs. In some embodiments, subsequent low-pass filtering can provide higher SI rejection for $PN_{WF,2}$ case.

FIG. 15C illustrates plot 1530 showing measured integrated in-band RX output power for modulated SI, in accordance with some embodiments. Here, integrated in-band power 1523 at RX baseband is shown as a function of input power of 1.46 Mb/s QPSK modulated SI with 1 MHz baseband integration bandwidth. Measurements demonstrate −11.8 dBm input-referred $P_{1\,dB}$ with respect to SI (translating to 13.2 dBm TX output assuming 25 dB TX/RX isolation). Here, the RX provides 35.5 dB gain for the desired signal, implying in-band SI rejection of 38.5 dB (from FIG. 15C) and +23.7 dBm $OP_{1\,dB}$ with respect to SI.

Figure 15D:
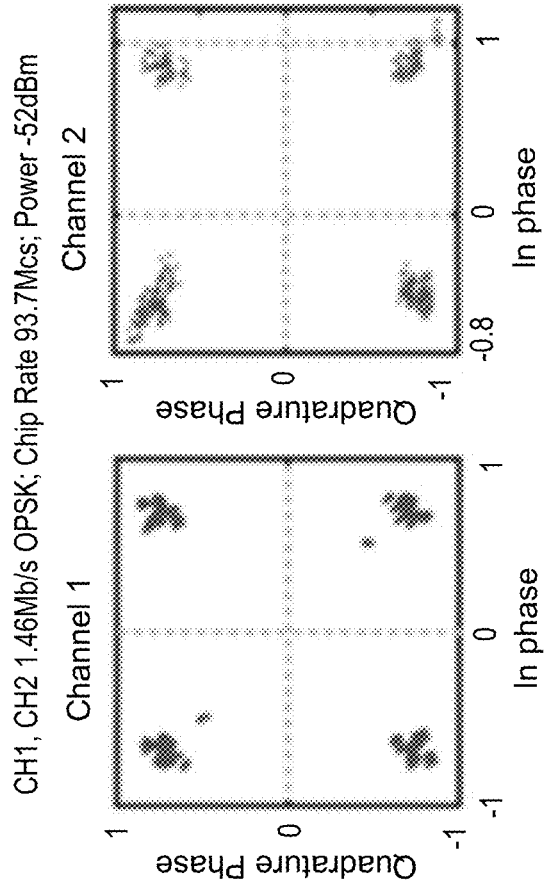
FIG. 15D illustrates a plot showing concurrent reception of two code-modulated RX signals at 750 MHz.

FIG. 15D shows the measured constellation 1540 for two concurrent 750 MHz 1.46 Mb/s QPSK signals spread with different PN codes at 93.75 Mcs demonstrating concurrent reception. Input power is limited by the input-referred oscilloscope noise.

Figure 15E:
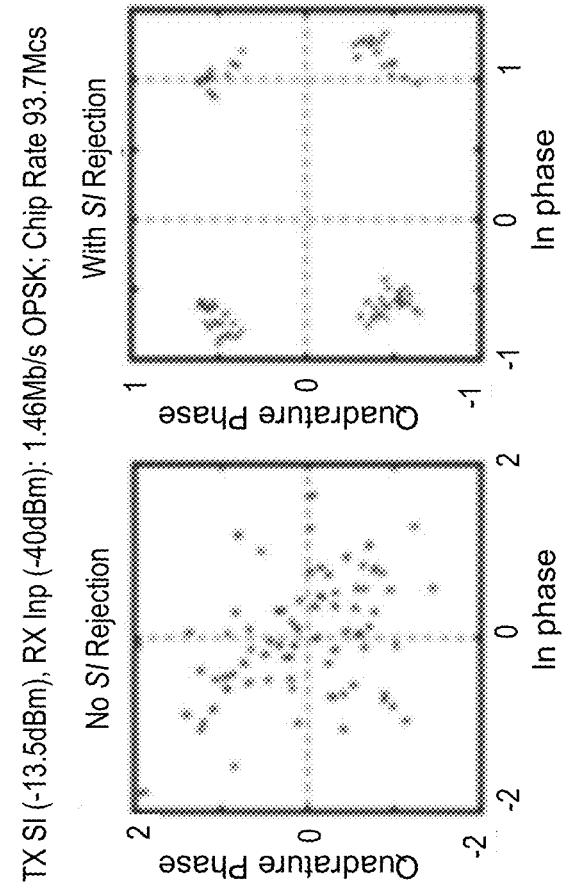
FIG. 15E illustrates a plot showing reception of desired 750 MHz RX signal in the presence of in-band SI following rejection approach, in accordance with some embodiments.

FIG. 15E shows the RX constellation recovery 1550 with SIRC for −40 dBm desired input and −13.5 dBm SI (both at 1.46 Mb/s QPSK).

The code-domain approach of some embodiments is compared to prior SIRC approaches in Table 1.

The RX of some embodiments is the first code-domain N-path RX for SIRC and achieves low power consumption, smaller area and low NF degradation, showing a path towards combining code-domain and SIC techniques for STAR.

FIG. 16 illustrates flowchart 1600 of a method of filtering, in accordance with some embodiments. While various blocks shown here are arranged in a particular order, the order is not fixed. For example, some blocks may be executed before others while some may be executed in parallel to other blocks.

At block 1601, an RF input is received by a receiver via an array of antennas. At block 1602, the RF input is provided to the N-path filter, wherein the N-path filter is coupled to the array of antennas. At block 1603, a combination of non-overlapping pulses and a pseudo noise (PN) code is applied to the RF input. In some embodiments, the N-path filter is a spatio-spectral notch filter, and wherein the method comprises concurrently rejecting two blockers at two independent frequencies or angle-of-incidence at each input of an antenna of the array. In some embodiments, the N-path filter comprises switches coupled to at least one antenna of the array. In some embodiments, at block 1604, the switches are controlled by a code sequence generated by a combination of the non-overlapping pulses, Walsh-functions, and the PN code. In some embodiments, at block 1605, a local oscillating signal is converted into the non-overlapping pulses as discussed with various figures.

Elements of embodiments (e.g., flowchart 1600 and scheme described with reference to FIGS. 1-15) are also provided as a machine-readable medium (e.g., memory) for storing the computer-executable instructions (e.g., instructions to implement any other processes discussed herein). The machine-readable medium (e.g., memory) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Program software code/instructions associated with flowchart 1600 (and/or various embodiments) and executed to implement embodiments of the disclosed subject matter may be implemented as part of an operating system or a specific application, component, program, object, module, routine, or other sequence of instructions or organization of

TABLE 1

|  | This work | Yang, JSSC 15 | [7] | Broek, ISSCC 15 | Zhou, ISSCC 16 |
|---|---|---|---|---|---|
| $f_c$ (GHz) | 0.3-1.4 | 0.5-1.5 | 0.8-1.4 | 0.15-3.5 | 0.6-0.8 |
| Arch | Code-domain N-path Mixer | Mixer-First TX/RX | Freq. Dom Eq. | Mixer First VM SI | Circulator+BB SIC |
| No. of RX O/P | 2 | 1 | 1 | 1 | 1 |
| RX Gain (dB) | 35/38 | 53 | 27-42 | 24 | 42 |
| RX NF (dB) | 2.5-4 + *0.9 dB filter mismatch | 8 | 4/8 | 6.3 | 5.0 |
| SIRC NF Deg | 0 dB | — | 1.1 dB | 4-6 dB | 6.5 dB* |
| IB IIP3 (dBm) | −26 | −38.7 | −20 | 8/16.2 | −33 |
| SI iPdB dB) @Gain (dB) | −11.8 35 | −9.7** 53 | −7.7** 27 | 9.3** 24 | −27.7** 42 |
| SIRC | 38.5 dB | 33 dB | 25 dB | 27 dB | 42 dB |
| BW | 1 MHz | 600 KHz | 20 MHz | 16.25 MHz | 12 MHz* |
| Power | 25.5 mW LNa 9.5 mW LO ~1 mW code mod. (sim) | 56 mW (incl. TX BB) | 250 mW | 23 to 56 mW | 199 mW* |
| Area (mm²) | 03.1 | 1.5 | 4.8 | 2 | 1.4 |

*includes circulator,
**computed from measured IIP3 (this work measured integrated power)

sequences of instructions referred to as "program software code/instructions," "operating system program software code/instructions," "application program software code/instructions," or simply "software" or firmware embedded in processor.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

The following examples are provided with reference to various embodiments.

Example 1

An apparatus comprising: a receiver; and one or more N-path filters coupled to an input of the receiver, wherein the one or more N-path filters apply a combination of non-overlapping pulses and a pseudo noise (PN) code.

Example 2

The apparatus of example 1 comprises an array of antennas coupled to one or more N-path filters, wherein the array of antennas comprise multiple-input-multiple-output (MIMO) array.

Example 3

The apparatus of example 2, wherein the one or more N-path filters are used as one or more spatio-spectral notch filters which are to concurrently reject two or more blockers at two or more independent frequencies or angle-of-incidence at each input of an antenna of the array.

Example 4

The apparatus of example 2, wherein the one or more N-path filters comprise switches coupled to at least one antenna of the array.

Example 5

The apparatus of example 4, wherein the switches are controllable by a code sequence generated by a combination of the non-overlapping pulses, Walsh-functions, or the PN code.

Example 6

The apparatus of example 5 comprises circuitry to convert a local oscillating signal into the non-overlapping pulses.

Example 7

The apparatus of example 5, wherein at least one switch of the switches is coupled to a capacitor and a resistor, wherein the resistor is coupled in parallel to the capacitor.

Example 8

The apparatus of example 5, wherein at least one switch of the switches is coupled to an inductor and a resistor, wherein the resistor is coupled in parallel to the inductor.

Example 9

The apparatus of example 1, wherein receiver comprises a code-domain N-path receiver.

Example 10

The apparatus of example 1, wherein the PN code includes one of: Gold code, Kasami code, Barker code, or M-sequences.

Example 11

A method comprising: receiving an RF input by a receiver via an array of antennas; providing the RF input to one or more N-path filters; and applying a combination of non-overlapping pulses and a pseudo noise (PN) code to the RF input.

Example 12

The method of example 11, wherein the one or more N-path filters are one or more spatio-spectral notch filters, and wherein the method comprises concurrently rejecting two or more blockers at two or more independent frequencies or angle-of-incidence at each input of an antenna of the array.

Example 13

The method of example 11, wherein the one or more N-path filters comprise switches coupled to at least one antenna of the array.

Example 14

The method of example 14 comprises controlling switches by a code sequence generated by a combination of the non-overlapping pulses, Walsh-functions, or the PN code.

Example 15

An apparatus comprising: an array of antennas that receives multiple RF inputs and provides multiple radio frequency (RF) or intermediate reference (IF) outputs; and one or more N-path filters to receive the RF or IF outputs, wherein the one or more N-path filters include switches for applying a combination of non-overlapping pulses and a pseudo noise (PN) code to the RF or IF outputs.

Example 16

The apparatus of example 15, wherein the one or more N-path filters comprise one or more spatio-spectral notch filters.

Example 17

The apparatus of example 16, wherein the one or more N-path filters are to concurrently reject two or more blockers at two or more independent frequencies or angle-of-incidence at each input of an antenna of the array.

Example 18

The apparatus of example 15, wherein switches of the one or more N-path filters are coupled to at least one antenna of the array.

Example 19

The apparatus of example 15 comprises circuitry to control the switches by a code sequence generated by a combination of the non-overlapping pulses, Walsh-functions, or the PN code.

Example 20

The apparatus of example 15, wherein at least one switch of the switches is coupled to a capacitor and a resistor, wherein the resistor is coupled in parallel to the capacitor.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

We claim:

1. An apparatus comprising:
   a receiver, which comprises a code-domain N-path receiver;
   one or more N-path filters coupled to an input of the receiver, wherein the one or more N-path filters apply a combination of non-overlapping pulses and a pseudo noise (PN) code; and
   an array of antennas coupled to one or more N-path filters, wherein the array of antennas comprises multiple-input-multiple-output (MIMO) array.

2. The apparatus of claim 1, wherein the one or more N-path filters operate as one or more spatio-spectral notch filters which are to concurrently reject two or more blockers at two or more independent frequencies or angle-of-incidence at each input of an antenna of the array.

3. The apparatus of claim 1, wherein the one or more N-path filters comprise switches coupled to at least one antenna of the array.

4. The apparatus of claim 3, wherein the switches are controllable by a code sequence generated by a combination of the non-overlapping pulses, Walsh-functions, or the PN code.

5. The apparatus of claim 4 comprises circuitry to convert a local oscillating signal into the non-overlapping pulses.

6. The apparatus of claim 4, wherein at least one switch of the switches is coupled to a capacitor and a resistor, wherein the resistor is coupled in parallel to the capacitor.

7. The apparatus of claim 4, wherein at least one switch of the switches is coupled to an inductor and a resistor, wherein the resistor is coupled in parallel to the inductor.

8. The apparatus of claim 1, wherein the PN code includes one of: Gold code, Kasami code, Barker code, or M-sequences.

9. A method comprising:
   receiving a radio frequency (RF) input by a receiver via an array of antennas;
   providing the RF input to one or more N-path filters, wherein the one or more N-path filters comprise switches coupled to at least one antenna of the array; and
   applying a combination of non-overlapping pulses and a pseudo noise (PN) code to the RF input.

10. The method of claim 9, wherein the one or more N-path filters are one or more spatio-spectral notch filters, and wherein the method comprises concurrently rejecting two or more blockers at two or more independent frequencies or angle-of-incidence at each input of an antenna of the array.

11. The method of claim 9 comprises controlling the switches by a code sequence generated by a combination of the non-overlapping pulses, Walsh-functions, or the PN code.

12. An apparatus comprising:
    an array of antennas that receives multiple RF inputs and provides multiple radio frequency (RF) or intermediate reference (IF) outputs; and
    one or more N-path filters to receive the RF or IF outputs, wherein the one or more N-path filters include switches for applying a combination of non-overlapping pulses and a pseudo noise (PN) code to the RF or IF outputs.

13. The apparatus of claim 12, wherein the one or more N-path filters comprise one or more spatio-spectral notch filters.

14. The apparatus of claim 13, wherein the one or more N-path filters are to concurrently reject two or more blockers at two or more independent frequencies or angle-of-incidence at each input of an antenna of the array.

15. The apparatus of claim 12, wherein the switches of the one or more N-path filters are coupled to at least one antenna of the array.

16. The apparatus of claim 12 comprises circuitry to control the switches by a code sequence generated by a combination of the non-overlapping pulses, Walsh-functions, or the PN code.

17. The apparatus of claim 12, wherein at least one switch of the switches is coupled to a capacitor and a resistor, and wherein the resistor is coupled in parallel to the capacitor.

18. An apparatus comprising:
a receiver; and
one or more N-path filters coupled to an input of the receiver, wherein the one or more N-path filters apply a combination of non-overlapping pulses and a pseudo noise (PN) code, and wherein the one or more N-path filters comprise switches coupled to at least one antenna of an array of antennas.

19. The apparatus of claim 18, wherein the switches are controllable by a code sequence generated by a combination of the non-overlapping pulses, Walsh-functions, or the PN code.

20. The apparatus of claim 19, comprises circuitry to convert a local oscillating signal into the non-overlapping pulses.

21. The apparatus of claim 18 comprises the array of antennas coupled to the one or more N-path filters, wherein the array of antennas comprises multiple-input-multiple-output (MIMO) array.

* * * * *